United States Patent
Li et al.

(10) Patent No.: US 12,202,683 B2
(45) Date of Patent: Jan. 21, 2025

(54) PROCESS SYSTEM OF FOLLOWER FIXTURE FOR TANK MOVING SUPPORT AND AUTOMATIC PROCESSING PRODUCTION LINE THEREOF

(71) Applicants: Qingdao University of Technology, Qingdao (CN); Qingdao Cabos Intelligent Manufacturing Co., Ltd, Qingdao (CN)

(72) Inventors: Changhe Li, Qingdao (CN); Dewei Liu, Qingdao (CN); Aiguo Qin, Qingdao (CN); Hanqi Fan, Qingdao (CN); Min Li, Qingdao (CN); Junting Li, Qingdao (CN); Tao Jiang, Qingdao (CN); Zongming Zhou, Qingdao (CN); Qidong Wu, Shanghai (CN); Bingheng Lu, Qingdao (CN); Bo Liu, Deyang (CN); Yun Chen, Chengdu (CN); Huajun Cao, Chongqing (CN); Cong Mao, Changsha (CN); Wenfeng Ding, Nanjing (CN); Xuefeng Xu, Hangzhou (CN)

(73) Assignees: Qingdao University of Technology, Qingdao (CN); Qingdao Cabos Intelligent Manufacturing Co., Ltd, Qingdao (CN)

( * ) Notice: Subject to any disclaimer, the term of this patent is extended or adjusted under 35 U.S.C. 154(b) by 558 days.

(21) Appl. No.: 17/564,544

(22) Filed: Dec. 29, 2021

(65) Prior Publication Data
US 2023/0142682 A1 May 11, 2023

(30) Foreign Application Priority Data
Nov. 10, 2021 (CN) .......................... 202111325872.1

(51) Int. Cl.
*B65G 47/57* (2006.01)
*B65G 43/10* (2006.01)

(52) U.S. Cl.
CPC ............. *B65G 47/57* (2013.01); *B65G 43/10* (2013.01); *B65G 2201/0235* (2013.01)

(58) Field of Classification Search
CPC ............................... B65G 43/10; B65G 47/57
See application file for complete search history.

(56) References Cited

U.S. PATENT DOCUMENTS 4,902,258 A * 2/1990 Dunsmore ................ H01J 9/48
445/66

FOREIGN PATENT DOCUMENTS

CN 207874889 U * 9/2018

* cited by examiner

*Primary Examiner* — Saul Rodriguez
*Assistant Examiner* — Brendan P Tighe
(74) *Attorney, Agent, or Firm* — True Shepherd LLC; Andrew C. Cheng

(57) ABSTRACT

A process system of a follower fixture for tank moving support is provided and includes a conveying table slidably provided with a bearing platform through a screw slide rail assembly and provided with an outer frame assembly; a lifting platform is slidably installed in the outer frame assembly; positions of the lifting platform and the bearing platform are corresponded up and down; the outer frame assembly is slidably provided with a robot component; both sides of the conveying table are provided with loading platforms; workpieces are placed on one loading platform, and a fixture system is placed on the other loading platform; the fixture system and the workpieces are both placed in the moving range of the robot component, and positions of the fixture system and the workpieces are corresponded. problems including processing flexibility cannot be realized can be solved.

14 Claims, 14 Drawing Sheets

PROCESS SYSTEM OF FOLLOWER FIXTURE FOR TANK MOVING SUPPORT AND AUTOMATIC PROCESSING PRODUCTION LINE THEREOF

TECHNICAL FIELD

The invention relates to the technical field of mechanical processing, particularly to a process system and an automatic processing production line of a follower fixture for tank moving support.

BACKGROUND

At present, because the moving support, balance shaft, inducer, shock absorber, buffer, limiter, supporting pulley, etc. of the tank track driving device are diverse and complex, a processing unit can only process one product in the production. When a different product needs to be processed, it not only requires operators to replace related fixtures and write corresponding processing programs, but also takes a lot of labor to transport workpieces. This not only increases the production cost and consumes a lot of production resources, but also causes installation errors, which seriously affects the machining accuracy of the workpieces. Heavy workpiece handling and long-term workshop work also pose a great threat to the health of workers. In view of the related problems such as diversity of tank track parts, large consumption of production resources, serious manpower burden, etc., it is urgent to change the production mode of tank track parts from the conventional manual-machine tool production mode to the automatic and flexible production mode. For examples, Chinese patent application No. CN201911087853.2 (corresponding to Chinese patent publication No. CN110773779A) discloses an intelligent plate parts processing production line combining general-purpose and special-purpose equipment. The production line is arranged in "square" shape, in which the processing equipment is distributed in linear way, and the four-axis and two-claw manipulator is used between the processing equipment to transport the material among the processing equipment. This layout lacks the processing flexibility, and the processing time of the processing equipment in the previous layer will affect all the following processing equipment, and when the processing equipment in a certain layer is overhauled, all equipment in the whole production line has to stop running, which further slows down processing efficiency. In addition, four-axis and two-claw manipulators among processing equipment increase the production cost of the production line and wastes production resources. Chinese patent application No. CN201911134902.3 (corresponding to Chinese patent publication No. CN 110900181A) discloses the automation of the upper and lower plates of spherical bridge supports. The layout of the production line is in-line layout, which requires a large space. The manipulator used in this production line adopts magnetic grabbing, which is only suitable for grabbing flat workpieces, and has no adaptability, so the diverse processing requirements of tank moving support workpieces cannot be met. Adopting a follower fixture is one of the important measures to solve the diversity and complexity of workpieces in automatic production line. Chinese patent application No. CN202011060737.4 (corresponding to Chinese patent publication No. CN112372180A) discloses a follower fixture base device, an automatic fixture switching system and a method. The fixture base device is driven by a rotating device to rotate a columnar placing seat, and the columnar placing seat is provided with a placement assembly for placing assembly fixtures. The fixture base may realize the switching of the follow-fixture with a robot. Although the follower fixture base and the automatic switching fixture system can meet the need of frequent fixture replacement in the automatic production line of automobile welding, it cannot solve the problem of positioning and clamping workpieces on the follower fixture for the diverse and complex workpiece production in the automatic production line of tank moving support, and the follower fixture base and the automatic switching fixture system only provides the space for placing the follower fixture, and cannot disassemble the follower fixture. When the follower fixture is used frequently, the wear of important parts will have considerable negative influence on the wear of the workpieces.

To sum up, in the face of the diversified and complex processing characteristics of tank moving support parts, the existing automatic production line technology cannot adapt to the processing and production of tank moving support because of the singular feeding device, conveying device and fixture, and the existing follower fixture technology cannot realize automatic positioning and clamping of workpieces on the follower fixture, and cannot realize automatic disassembly and assembly of the follower fixture, which seriously affects the processing accuracy of workpieces.

SUMMARY

The objective of the invention is to provide a process system and an automatic processing production line for the follower fixture for tank moving support, which can solve the above-mentioned problems in the prior art, resolve the problem that processing flexibility cannot be realized due to diverse complex tank moving support parts, and realize automatic disassembly and assembly of the follower fixture, positioning of workpieces on the follower fixture and fixture automation.

In order to achieve the above objectives, the invention provides the following scheme: the invention provides the process system for the follower fixture for tank moving support, which includes a conveying table; the conveying table is slidably provided with a bearing platform through a screw slide rail assembly;

the conveying table is also provided with an outer frame assembly crossed the conveying table; a lifting platform is slidably installed in the outer frame assembly; the positions of the lifting platform and the bearing platform are corresponded up and down; one side of the outer frame assembly is also provided with a robot component in a sliding way;

two sides of the conveying table are also provided with loading platforms; a plurality of workpieces are placed on one loading platform, and a fixture system is placed on the other loading platform; the fixture system and the workpieces are both placed in the moving range of the robot component, and the fixture system and the workpieces are in corresponding positions.

The conveying table includes a fixed bracket and a conveying mounting seat; the top surface of the fixed bracket is fixedly provided with the conveying mounting seat; the cross section of the conveying mounting seat is a rectangular shape with an inwardly concaved middle portion at one side; a first rack is also installed on one side wall of the inner cavity of the conveying mounting seat, and the first rack is meshed with the mounting gear of the quick insertion device; the quick insertion device and the fixture system are arranged at the same side of the conveying mounting seat.

The screw slide rail assembly includes a horizontal ball screw, linear guide rails and a horizontal screw motor; the horizontal ball screw is fixedly installed on the bottom surface of the inner cavity of the conveying mounting seat; the horizontal screw motor is in transmission connection with one end of the horizontal ball screw through a coupling (also referred to as coupler), and the horizontal screw motor is fixedly installed at one side of the top surface of the fixed bracket;

the top surface of both sides of the conveying mounting seat are respectively fixedly provided with the linear guide rails;

sliding tables are arranged on the ball screw and the linear guide rails in a sliding way, and the bearing platform is fixedly installed on the sliding tables.

Two ends of the linear guide rail are respectively provided with a photoelectric sensor and a stop seat; the photoelectric sensor is used for monitoring the moving position of the bearing platform and transmitting signals to the computer, and the computer stops the rotation of the horizontal ball screw; the stop seat is used for mechanically stopping the movement of the bearing platform.

The quick insertion device includes a sliding block, electromagnetic valves, a quick air pipe connector and a speed reduction motor; the sliding block is slidably installed on the linear guide rail; at least two electromagnetic valves are linearly arranged and fixedly installed on the sliding block; the outlet end of the electromagnetic valves is connected with the quick air pipe connector; the quick air pipe connector corresponds to the position of the air passage interface of the fixture system; the side wall of the sliding block is fixedly provided with the speed reduction motor; the mounting gear on the main shaft of the speed reduction motor is engaged with the first rack.

The outer frame assembly includes an Π-shaped bracket (also referred to as Ⅱ-shaped bracket); the vertical middle plane of the Π-shaped bracket coincides with the vertical middle planes of the lifting platform and the conveying table;

two ends of the top surface of the Π-shaped bracket are respectively fixedly provided with a vertical motor; the main shafts of the two vertical motors penetrate through the top surface of the Π-shaped bracket and are respectively connected with a vertical ball screw through a coupling;

the two vertical ball screws are vertically arranged at both end of that Π-shaped bracket and are arranged at the same side of the Π-shaped bracket; first guide rods are vertically arranged between the side surface of the Π-shaped bracket and the vertical ball screw;

the vertical ball screw is also provided with a mounting table; the top surface of the mounting table is also provided with through holes, and the mounting table is slidably mounted on the first guide rods through the through holes.

The top surface of the mounting table is provided with two through holes, and the first guide rods are arranged in the two through holes; each vertical ball screw and two first guide rods are arranged in a triangular structure; the side of the mounting table far away from the Π-shaped bracket is provided with the robot component through a slewing support.

The inner cavity of the Π-shaped bracket is also vertically provided with second guide rods and second racks; the second guide rods and the second racks are symmetrically arranged in two groups left and right; the lifting platform is slidably arranged on the second guide rods, and the lifting platform realizes lifting movement on the second racks.

The lifting platform includes a bearing plate, wherein an optical axis and a transmission shaft are horizontally arranged in the bearing plate; the top surface of the bearing plate is provided with a bearing motor, and the mounting gear on the main shaft of the bearing motor meshes with the gear at one end of the transmission shaft up and down to realize transmission connection; the gears at both ends of the transmission shaft are meshed with the two second racks;

two ends of the optical axis are respectively slidably installed on the two second guide rods through a T-joint;

one side of the bearing plate is also fixedly provided with a bending mounting plate; the bending mounting plate is provided with a right-angle plate through a crank-slider mechanism; the right-angle plate is orderly provided with tooling plates.

The crank-slider mechanism include a reciprocating guide rail, a bearing cylinder, a flange and two connecting rods; the reciprocating guide rail is provided with the right-angle plate through two sliding blocks; the middle of the top surface of the bending mounting plate is provided with the bearing cylinder, the piston rod of the bearing cylinder is placed upward, and the flange is installed at the output end of the piston rod; the two connecting rods are obliquely arranged, the top ends are respectively hinged with the flange, and one end of the bottom ends are respectively hinged with one side of the two sliding blocks on the reciprocating guide rail.

The robot component includes a first robot and a second robot; the first robot and the second robot are respectively installed on the two mounting tables; the first robot and the fixture system are placed on the same side, and the second robot and the workpieces are placed on the same side.

The first robot includes a main motor, a turntable and a first mechanical claw; the main motor is fixedly installed at one side of the mounting table; the mounting table is provided with the turntable through the slewing support; the turntable is in transmission connection with the main motor; the first mechanical claw is installed on the turntable; the first mechanical claw is used for transporting the fixture system.

One side of the fixture system is also provided with a screwing manipulator; the screwing manipulator is used to screw the fixture system onto the tooling plate of the lifting platform.

The second robot includes a second mechanical claw, the main motor and the turntable;

the second mechanical claw includes a second mounting seat, an upper mounting plate, a supporting block, an industrial camera and guide rods the second mounting seat is mounted on the turntable; the industrial camera is mounted on that second mounting seat, and the camera lens of the industrial camera faces the upper mounting plate; the second mounting seat is fixedly connected with the upper mounting plate; guide grooves are correspondingly arranged on the second mounting seat and the upper mounting plate in the circumferential direction, and the number of the guide grooves is the same as that of the guide rods;

two ends of the guide rods are respectively installed in the guide groove of the second mounting seat and the upper mounting plate; the supporting block is installed at one end of the guide rods and is limited on the end face of the upper mounting plate;

a steering gear is installed on the second mounting seat, and the guide rods are connected with the steering arm of the steering gear through a connecting rod, so as to realize the radial movement of the guide rods.

An automatic processing production line includes the follower fixture process system, an automatic conveying device, a circular conveyor line, a horizontal machining center, a buffer table, a robot, a vertical machining center, a safety protection system and a monitoring system.

The invention discloses the following technical effects: (1) the invention solves the technical problems that need to be solved urgently, such as the singular production of processing unit caused by diverse and complex tank crawler parts and the waste of manpower and material resources caused by the conventional production mode, in which the worker cooperates with machine tool, realizes automatic and flexible production of tank crawler moving support and the whole process of unmanned automatic flexible production, enables the processing accuracy ±0.003 mm and the repeated positioning accuracy ±0.002 mm, further improves the product quality, production capacity and production resource utilization rates, and realizes automatic, lean and flexible production and processing.

(2) the tooling system of the follower fixture of the invention solves the problem that the follower fixture assembled by the original fixture and the tooling plate are manually assembled when there are diverse moving support workpieces, so that the follower fixture is more flexible;

(3) the invention may keep workers away from processing equipment, and improve the safety of workers' operating environment, and has low cost, a compact structure and high space utilization rate.

BRIEF DESCRIPTION OF THE DRAWINGS

In order to more clearly explain the embodiments of the invention or the technical schemes in the prior art, the drawings needed in the embodiments will be briefly introduced below. Apparently the drawings in the following description are only some embodiments of the invention, and for ordinary technicians in the field, other drawings can be obtained according to these drawings without making creative efforts.

Figure 1:
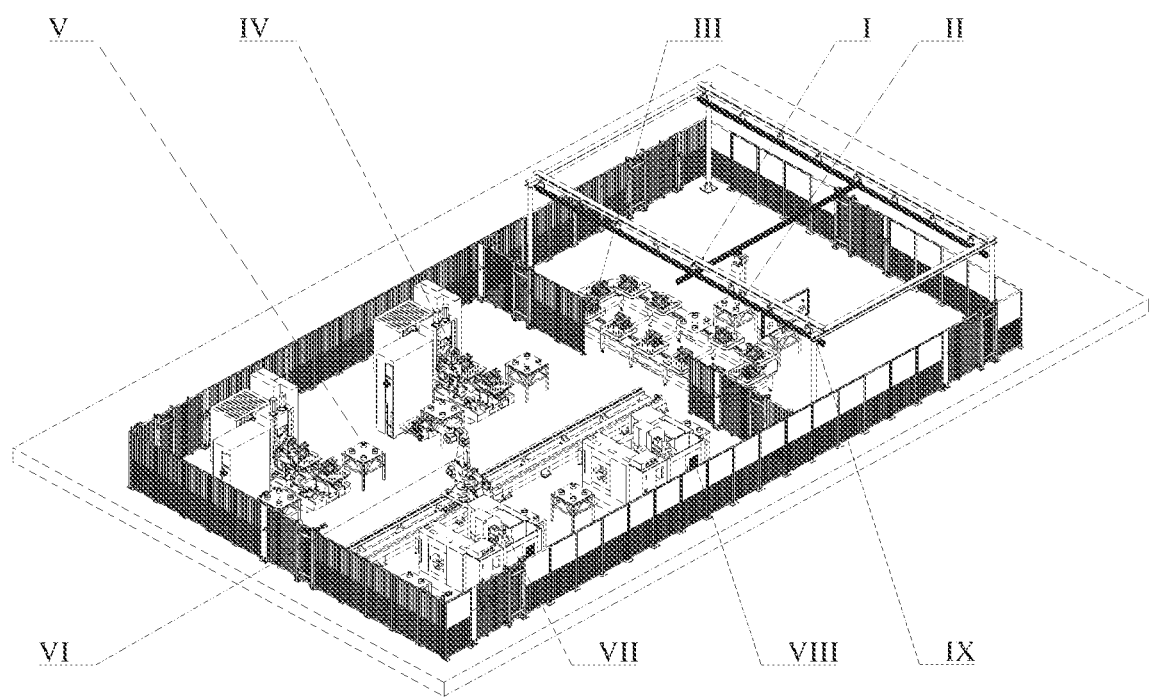
FIG. 1 is an axonometric drawing of an automatic processing production line of a moving support according to the Embodiment 1 of the invention.

among them, Embodiment 1: truss power-assisted crane I, installation workbench II, circular conveyor line III, horizontal machining center IV, buffer table V, robot VI, vertical machining center VII, safety protection system VIII and monitoring system IX;

Embodiment 2: follower fixture process system I, automatic conveying device II, circular conveyor line III, horizontal machining center IV, buffer table V, robot VI, vertical machining center VII, safety protection system VIII and monitoring system IX;

Embodiment 3: outer frame assembly I-1, lifting platform I-2, first robot I-3, second robot I-4, conveying table I-5, quick insertion device I-6, fixture system I-7, workpiece I-8, screwing manipulator I-9, loading platform I-10 and tooling plate I-11;

H-shaped bracket I-1-1, motor I-1-2, ball screw I-1-3, sliding table I-1-4, first guide rod I-1-5, rack I-1-6 and second guide rod I-1-7;

bearing plate I-2-1, bending mounting plate I-2-2, motor I-2-3, cylinder I-2-4, flange I-2-5, connecting rod I-2-6, linear guide rail I-2-7, right-angle plate I-2-8, stop block I-2-9, plain shaft I-2-10 and transmission shaft I-2-11;

main motor I-3-1, turntable I-3-2, mechanical claw I-3-3, mounting seat I-3-3-1, strut I-3-3-2, cylinder I-3-3-3, V-shaped block I-3-3-4 and industrial camera I-3-3-5;

mounting seat I-4-1, upper mounting plate I-4-2, supporting block I-4-3, industrial camera I-4-4 and guide rod I-4-5;

inner circle I-8-1, bottom surface I-8-3, side curved surface I-8-4, side plane I-8-5 and mounting surface I-8-2;

conveying table I-5, bracket I-5-1, mounting seat I-5-2, ball screw I-5-3, linear guide rail I-5-4, bearing platform I-5-5, photoelectric sensor I-5-6, stop seat I-5-7 and rack I-5-8;

sliding block I-6-1, solenoid valve I-6-2, quick air pipe connector I-6-3, and speed reduction motor I-6-4;

Embodiment 4: fixture I-7-1, bottom plate I-7-1-1, first column I-7-1-2, second column I-7-1-3, pressure bar I-7-1-4, profiling positioning block I-7-1-5, strip positioning block I-7-1-6, heightening column I-7-1-7, first cylinder I-7-1-8, second cylinder I-7-1-9, connecting rod I-7-1-10, roller I-7-1-11, guide rod I-7-1-12, V-shaped block I-7-1-11 and supporting nail I-7-1-14;

Embodiment 5: fixture I-7-2, bottom plate I-7-2-1, first column I-7-2-2, second column I-7-2-3, pressing plate I-7-2-4, profiling positioning block I-7-2-5, strip positioning block I-7-2-2; heightening column I-7-2-7, V-shaped block I-7-2-8 and supporting nail I-7-2-9.

DETAILED DESCRIPTION OF THE EMBODIMENTS

Next, the technical schemes in the embodiments of the invention will be clearly and completely described with reference to the drawings in the embodiments of the invention. Obviously, the described embodiments are only part of the embodiments of the invention, not all of them. Based on the embodiments in the invention, all other embodiments obtained by ordinary technicians in the field without creative efforts are within the scope of the invention.

In order to make the above-mentioned objects, features and advantages of the invention more obvious and easier to understand, the invention will be described in further detail below with reference to the drawings and detailed description.

Embodiment 1

As shown in FIG. 1, the automatic processing production line of moving support proposed in the Embodiment 1 includes truss power-assisted crane I, installation workbench II, circular conveyor line III, horizontal machining center IV, buffer table V, robot VI, vertical machining center VII, safety protection system VIII and monitoring system IX, wherein two horizontal machining centers IV are placed adjacent to each other and opposite to two vertical machining centers VII, the robot VI is placed between the horizontal machining center IV and the vertical machining center VII, the robot VI is installed on the ground rail and can move along the ground rail, and two buffer tables V are placed at both ends of each horizontal machining center IV and vertical machining center VII respectively. Thereby, horizontal machining center IV, buffer table V, robot VI and vertical machining center VII constitute the processing area. A workpiece placement area is set next to the processing area, which includes truss power-assisted crane I, installation workbench II, circular conveyor line III and monitoring system IX, wherein the annular conveying line III is installed in the middle of the end of the truss power-assisted crane I, close to the processing area, the installation table II is installed at the right end of the circular conveyor line III, and the monitoring system IX is placed close to the installation table II. Among them, the area above the installation table II is the workpiece placement area before processing, and the area below the installation table II is the workpiece placement area after processing.

Specifically, the truss power-assisted crane I: used for assisting in transporting the moving support before processing positioned and clamped on the follower fixture to the circular conveyor line III or transport the moving support after processing and the follower fixture to the installation workbench II; installation table II: used for installing and disassembling the follower fixture and the moving support; circular conveyor line III: used for loading and unloading transportation of the follower fixture and the moving support; horizontal machining centers IV and vertical machining centers VII: equipped with a zero-point positioning system, which is responsible for positioning and clamping the follower fixture and finishing the machining of the moving support; buffer table V: used to temporarily store unprocessed or processed moving supports and adjust the takt time; robot VI: used for the loading and unloading of the moving support and fixture; safety protection system VIII: used for preventing irrelevant personnel from entering by mistake, resulting in unnecessary damage consisting of a protective fence, an alarm and a camera, wherein the camera and the alarm are installed on the protective fence for monitoring and alarming; monitoring system IX: consisting of workbench, monitor and 2D image scanner, which is used to monitor the internal and surrounding environment of the production line and track the processing information of the moving support.

Figure 2:
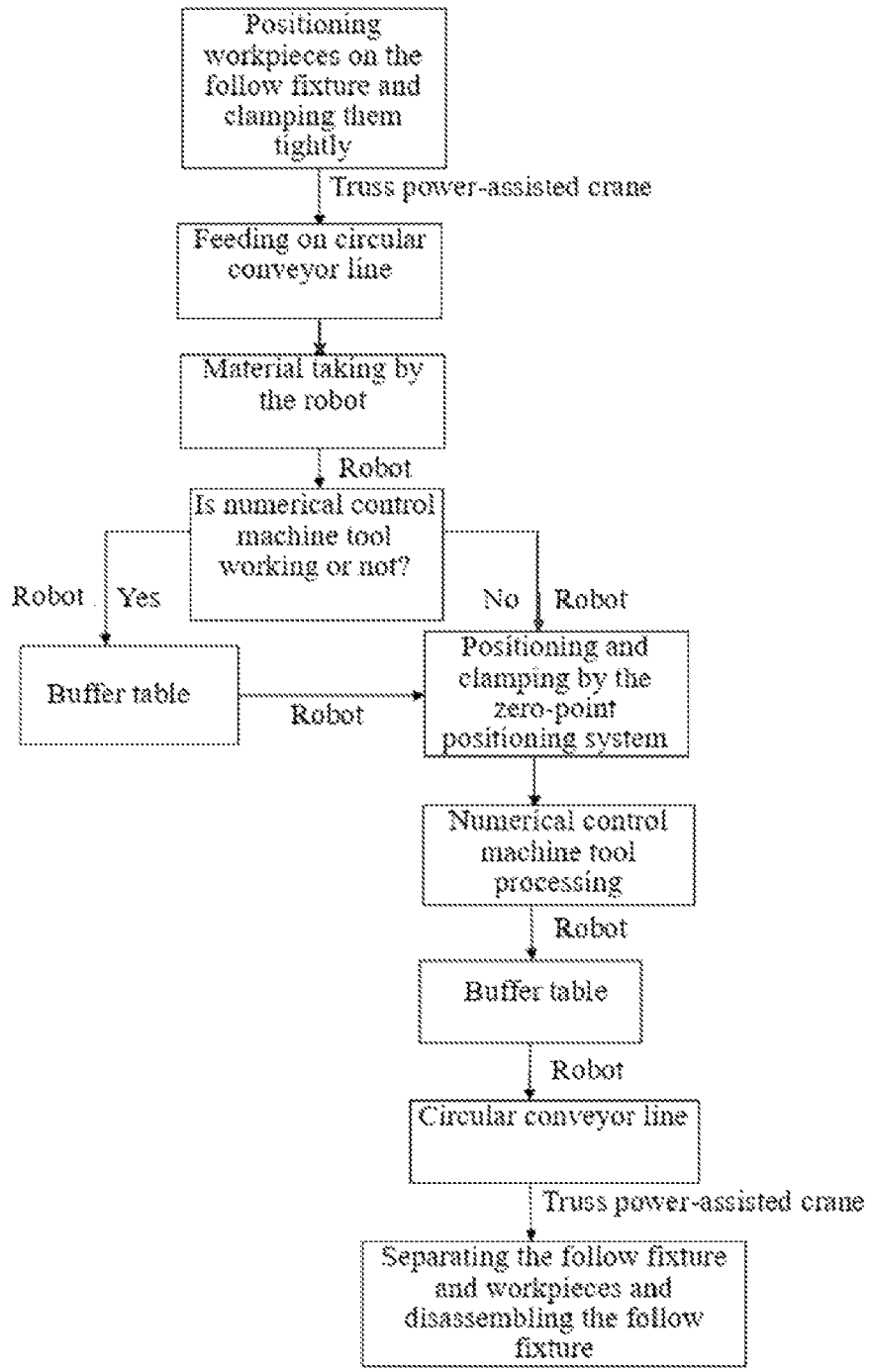
FIG. 2 is a flow chart of the automatic processing production line of the moving support according to the Embodiment 1 of the invention.

As shown in FIG. 2, the processing flow of the automatic processing production line for moving support is as follows: step 1, the operator installs the follower fixture on the installation workbench, and positions and clamps the moving supports to be processed on the follower fixture. There are two-dimensional bar codes on the follower fixture. When installing the follower fixture, the operator needs to scan the two-dimensional bar codes on the follower fixture on the two-dimensional image scanner in the monitoring system IX. Because the follower fixture is in one-to-one correspondence with different kinds of moving supports, by scanning the follower fixture used by a certain kind of moving support, the PLC control system can know the kinds of moving supports in this machining process, control the movement trajectory of the robot VI, and select the corresponding machining program by the horizontal machining center IV or the vertical machining center VII; step 2, the workers will transport the installed follower fixture and moving support to the moving tray on the circular conveyor line III through the truss power-assisted crane I and position it. The annular conveying line III conveys the follower fixture and the moving support to a predetermined position to wait for the robot VI to load; step 3, the robot VI transports the follower fixture and the moving support to the zero-point positioning system in the corresponding horizontal machining center IV or vertical machining center VII for positioning and clamping. If the corresponding machining center is in the process of machining, the PLC control system will control the robot VI to place the follower fixture and the moving support on the buffer table V next to the machining center; step 4, the machining center processes the moving support; step 5, the robot VI places the follower fixture and the processed moving support on the buffer table V, and transports the next follower fixture and the unprocessed moving support from the buffer table V to the zero-point positioning system of the machining center for positioning and processing; step 6, the robot VI transports the follower fixture and the processed moving support from the buffer table V to the moving tray on the circular conveyor line III, and the circular conveyor line III transports the follower fixture and the processed moving support to a predetermined position; and finally, the operator transports the follower fixture and the processed moving support to the operating table through the truss power-assisted crane, disassemble the follower fixture and the processed moving support, and maintain the disassembled follower fixture.

Figure 3:
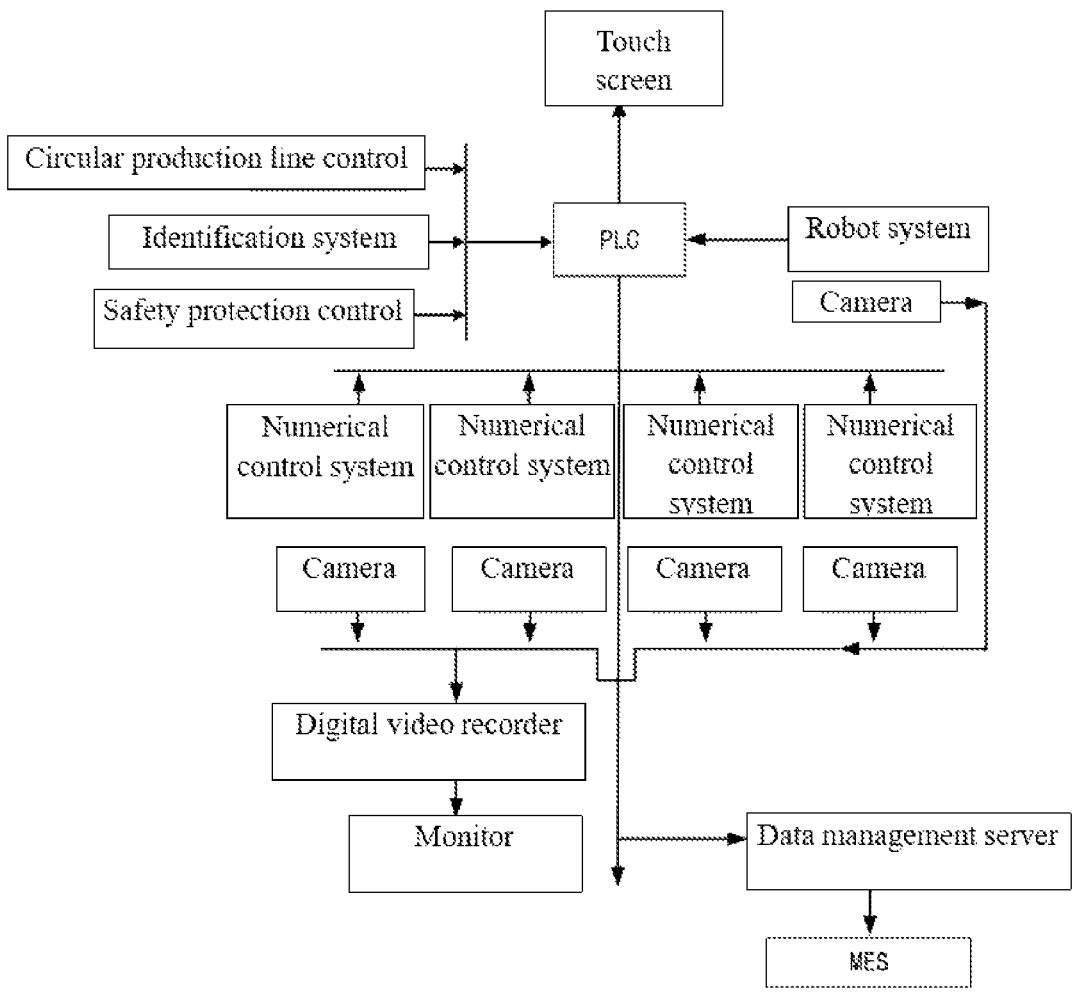
FIG. 3 is an electrical control system diagram of the moving support automatic processing production line according to the Embodiment 1 of the invention.

As shown in FIG. 3, the electrical control system of the moving support automatic processing production line includes the PLC, the touch screen, the robot system, the numerical control system, the identification system, the loop line control, the safety protection control, the video monitoring system and the data management server. The control system, loop line control, identification system, safety protection control and robot system are connected to the PLC system. Operators can realize man-machine communication through the touch screen. Camera data is stored in the hard disk video recorder and real-time monitoring images are displayed through the display. The PLC is connected to the data management server and connected to the MES system.

Embodiment 2

Figure 4:
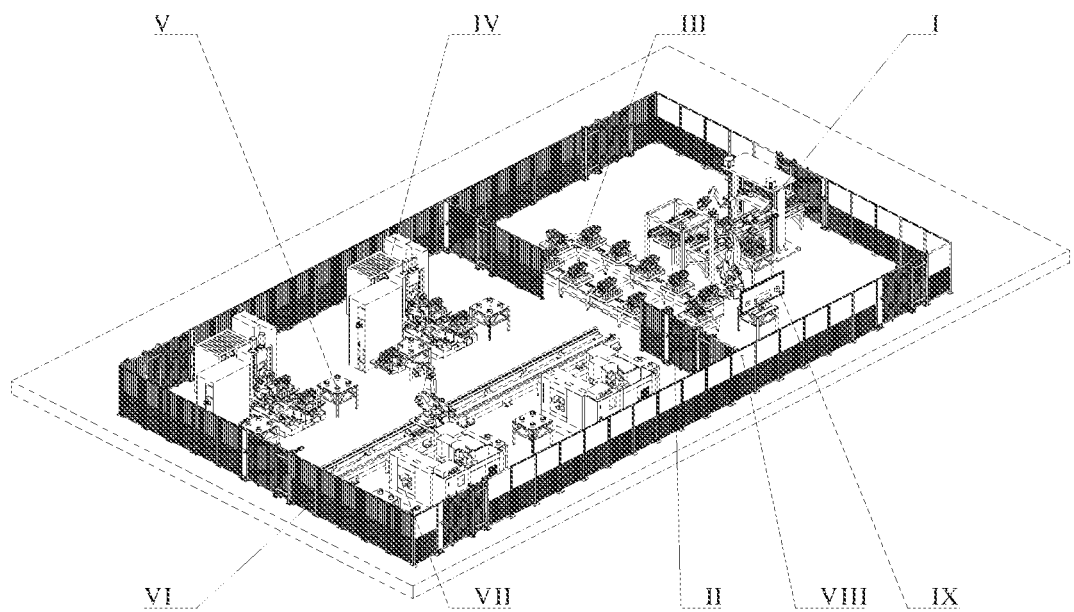
FIG. 4 is an axonometric drawing of the automatic processing production line of the moving support according to the embodiment 2 of the invention.

As shown in FIG. 4, another moving support automatic processing production line proposed in Embodiment 2 includes the follower fixture process system I, the automatic conveying device II, the circular conveyor line III, the horizontal machining center IV, the buffer table V, the robot VI, the vertical machining center VII, the safety protection system VIII and the monitoring system IX. Among them, the positional relationships and functions of the circular conveyor line III, horizontal machining center IV, buffer table V, robot VI, vertical machining center VII, safety protection system VIII and monitoring system IX are the same as those in the Embodiment 1. In Embodiment 2, the conveying device II is arranged in the middle of the right side of the circular conveyor line III, and the right end of the conveying device II is provided with the follower fixture process system I.

Specifically, the follower fixture process system I can realize the disassembly and assembly of different follower fixtures, and at the same time realize the positioning and clamping of the follower fixture corresponding to the moving support. Automatic conveying device II transports the follower fixture and the moving support from the follower fixture process system I to the circular conveyor line III.

Figure 5:
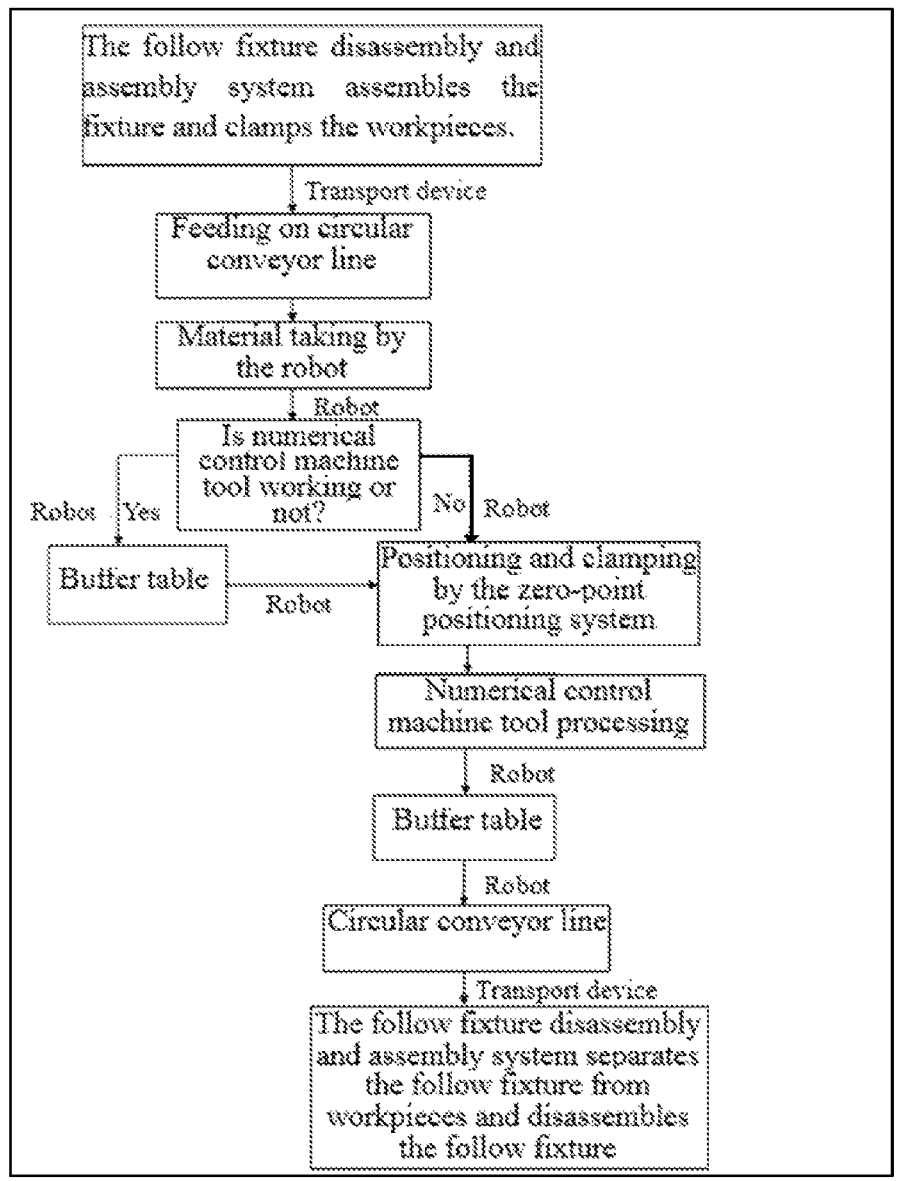
FIG. 5 is a flow chart of the automatic processing production line of the moving support according to the Embodiment 2 of the invention.

As shown in FIG. 5, in the step 1 and the last step of the processing flow of the moving support automatic processing production line described in the Embodiment 2, the follower fixture process system I realizes the installation and disassembly of the follower fixture, and the assembly and separation of the workpieces and the follower fixture, and the automatic conveying device II realizes the transportation of the follower fixture and the workpieces from the follower fixture process system I to the circular conveying line III. The rest of the production process is the same as that described in Embodiment 1.

Embodiment 3

Figure 6:
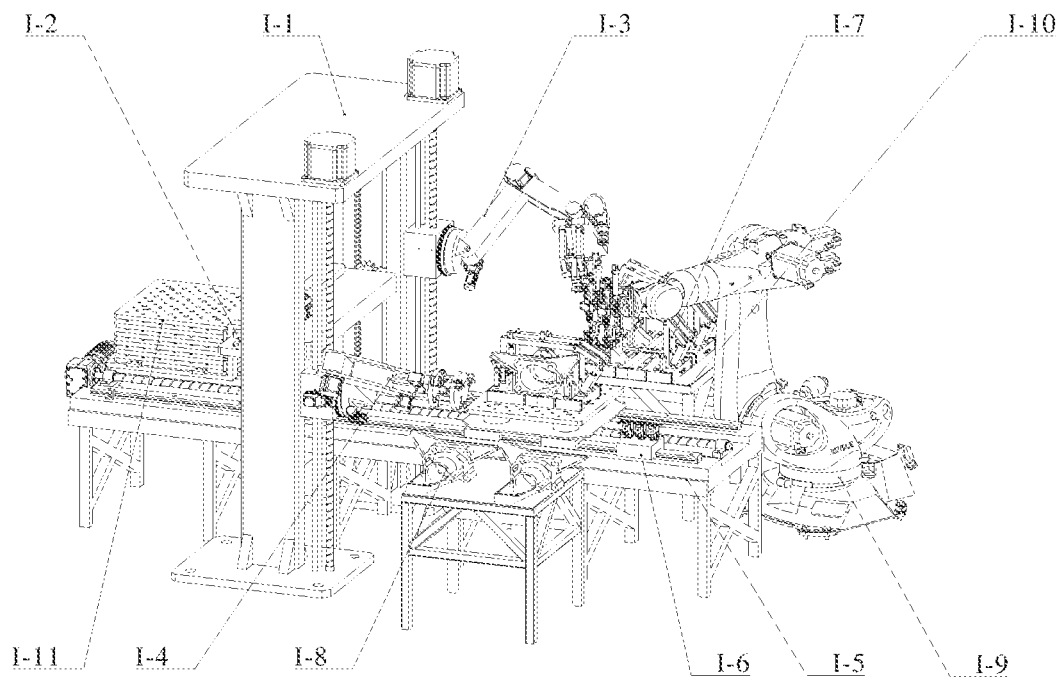
FIG. 6 is an axonometric drawing of the follower fixture process system according to the Embodiment 3 of the invention.

The embodiment 3 proposes a process system of follower fixture as shown in FIG. 6 and the process system of follower fixture is included of the outer frame assembly I-1, the lifting platform I-2, the first robot I-3, the second robot I-4, the conveying table I-5, the quick insertion device I-6, the fixture system I-7, the workpiece I-8, the screwing manipulator I-9, the loading platform I-10, wherein the lifting platform I-2 is installed in the middle of the outer frame assembly I-1, the first robot I-3 and the second robot I-4 are installed on both sides of the outer frame assembly I-1, the conveying table I-5 is installed on the middle line of the outer frame assembly I-1, the quick insertion device I-6 is installed on the guide rail of the conveying table I-5, and the fixture system I-7 and the moving support I-8 are respectively placed on loading platform I-10 both sides of the conveying table I-5.

Figure 7:
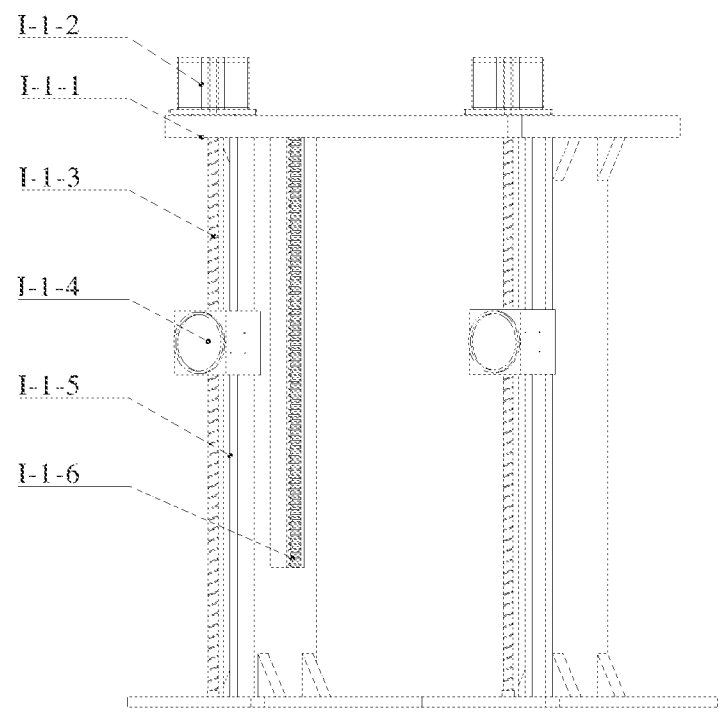
FIG. 7 is an axonometric drawing of the outer frame assembly according to the Embodiment 3 of the invention.
Figure 8:
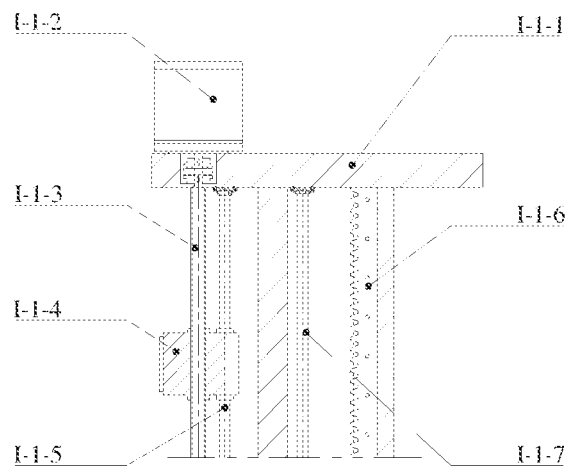
FIG. 8 is a sectional view of the outer frame assembly according to the Embodiment 3 of the invention.

Specifically, the outer frame assembly I-1 is used for installing the lifting platform I-2, the first robot I-3 and the second robot I-4 and controlling the lifting of the lifting platform I-2, the first robot I-3 and the second robot I-4 on the outer frame assembly I-1; lifting platform I-2 is used for palletizing and distributing the tooling plate I-11 on the bearing platform I-5-5; the first robot I-3 is liftable and used to transport the fixture system I-7 to the conveying table I-5; the second robot I-4 is liftable and used to transport the workpieces I-8 to the conveying table I-5; conveying table I-5 is used to convey the bearing platform I-5-5 to the designated position; quick insertion device I-6 is designed for inserting the air pipe connector of fixture system I-7, and delivering high-pressure air source to make the locking cylinder in fixture system I-7 work; fixture system I-7 is used for positioning and clamping workpieces I-8; screwing manipulator I-9 is used for tightening the screws on the fixture system I-7 so that the fixture system I-7 is fixedly installed on the tooling plate; loading platform I-10 is used for placing workpieces I-8 and fixture system I-7;

As shown in FIG. 6-FIG. 8, the outer frame assembly I-1 includes the Π-shaped bracket I-1-1, the motor I-1-2, the ball screw I-1-3, the sliding table I-1-4, the first guide rods I-1-5, the rack I-1-6 and the second guide rod I-1-7, wherein Π-shaped bracket I-1-1 is the main bearing component, and two sides of the Π-shaped bracket I-1-3 are symmetrically installed with one ball screw I-1-3 and two first guide rods I-1-5, the ball screw I-1-3 is connected with the main shaft of the motor I-1-2 fixedly installed on the top of the I-bracket I-1-1 through coupling, and the two first guide rods I-1-5 are installed at the rear side of the ball screw I-1-3, the two first guide rods I-1-5 and the ball screw I-1-3 are installed in a triangle, the ball screw is equipped with a sliding table I-1-4, and the sliding table I-1-4 is provided with an annular boss for the installation of the slewing support, and the second guide rod I-1-7 and the rack I-1-6 are installed in the square groove of the Π-shaped bracket I-1-1.

Figure 9:
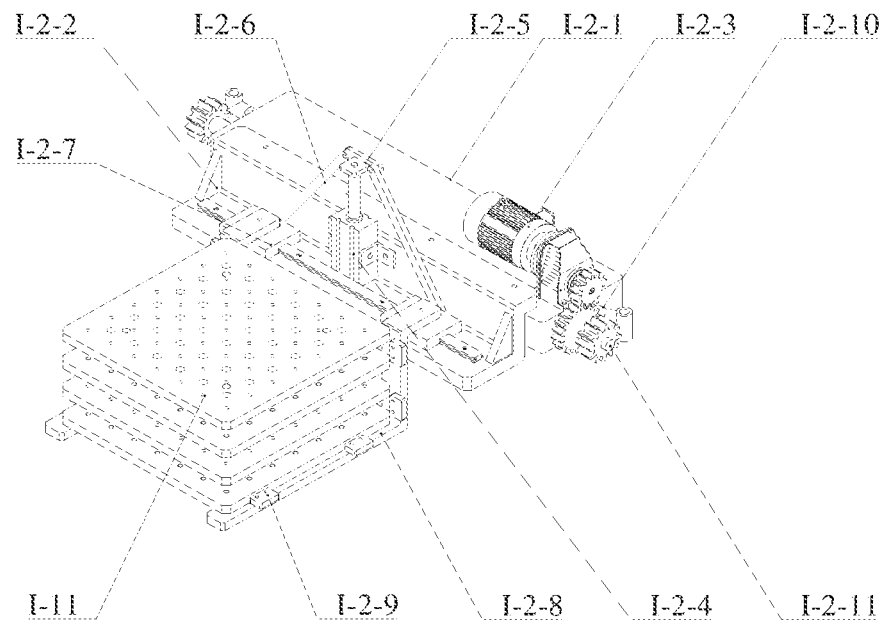
FIG. 9 is an axonometric drawing of the lifting platform according to the Embodiment 3 of the invention.
Figure 10:
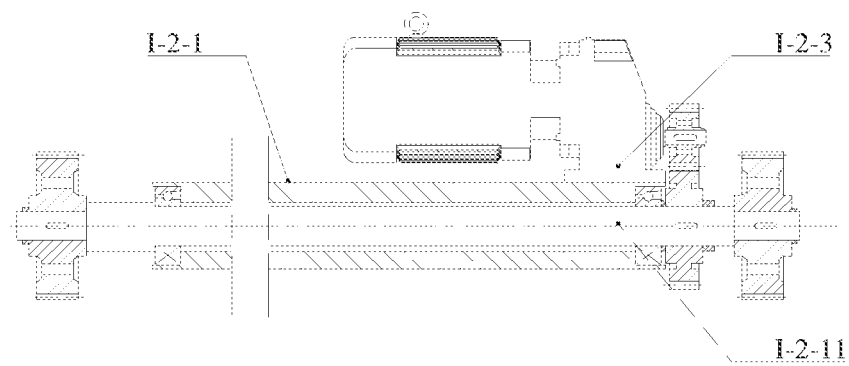
FIG. 10 is a sectional view of the lifting platform according to the Embodiment 3 of the invention.
Figure 11:
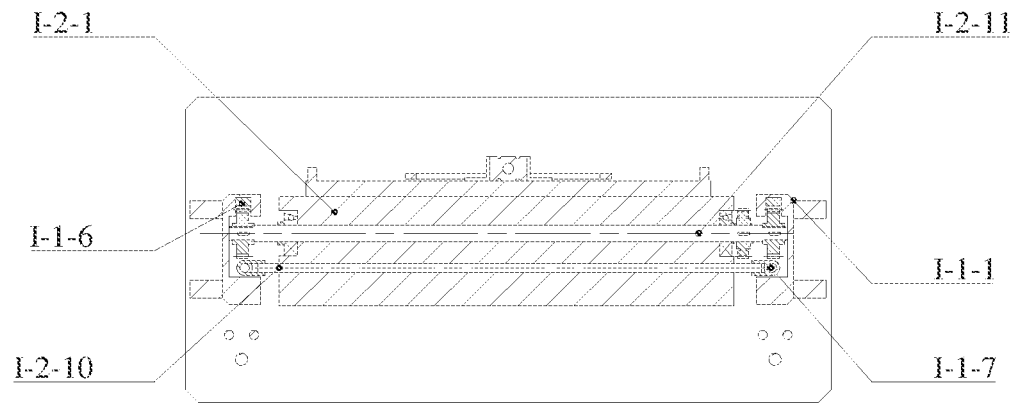
FIG. 11 is a sectional view of the installation of the lifting platform and the outer frame assembly according to the Embodiment 3 of the invention.

As shown in FIG. 9-FIG. 11, the lifting platform I-2 includes the bearing plate I-2-1, the bending mounting plate I-2-2, the motor I-2-3, the cylinder I-2-4, the flange I-2-5, the connecting rod I-2-6, the linear guide rail I-2-7, the right-angle plate I-2-8, the stop block I-2-9 and the plain shaft I-2-10, the transmission shaft I-2-11, wherein the motor I-2-3 is installed on the bearing plate I-2-1. The gear on the main shaft of the motor I-2-3 meshes with the gear installed on the transmission shaft I-2-11 on the bearing plate I-2-1. The gears installed at both ends of the transmission shaft I-2-11 mesh with the rack I-1-6 in the outer frame assembly I-1. The bearing plate I-2-1 is installed with plain shaft I-2-10 and the two ends of the plain shaft I-2-10 are installed in the second guide rod I-1-7 in the outer frame assembly I-1 through the three-joint sliding sleeve, so that the rotation of the main shaft of the motor I-2-3 can make the bearing plate I-2-1 perform the ascending and descending actions through gear-gear and gear-rack transmission. The bending mounting plate I-2-2 is fixedly mounted on the bearing plate I-2-1, and the middle of the bending mounting plate I-2-2 is provided with cylinder I-2-4 and linear guide rail I-2-7, the piston rod of the cylinder I-2-4 is placed upward, the output end of the piston rod is provided with flange I-2-5, and one end of the two connecting rods I-2-6 are respectively hinged with the flange I-2-5, and the other end is respectively hinged with two sliding blocks on the linear guide I-2-7. Therefore, the cylinder I-2-4, the flange I-2-5, the connecting rods I-2-6 and the linear guide I-2-7 together constitute a crank-slider mechanism. Under the action of the piston rod of the cylinder I-2-4, the sliding blocks on the linear guide I-2-7 can move towards or away from each other. The two sliding blocks of the linear guide I-2-7 are respectively provided with right-angle plates I-2-8, and the right-angle plates I-2-8 are provided with stop blocks I-2-9. When the sliding blocks of the linear guide I-2-7 drives the right-angle plates I-2-8 to move in alignment, the stop block on the right-angle plates I-2-8 can make the tooling plate I-11 tidy.

Figure 12:
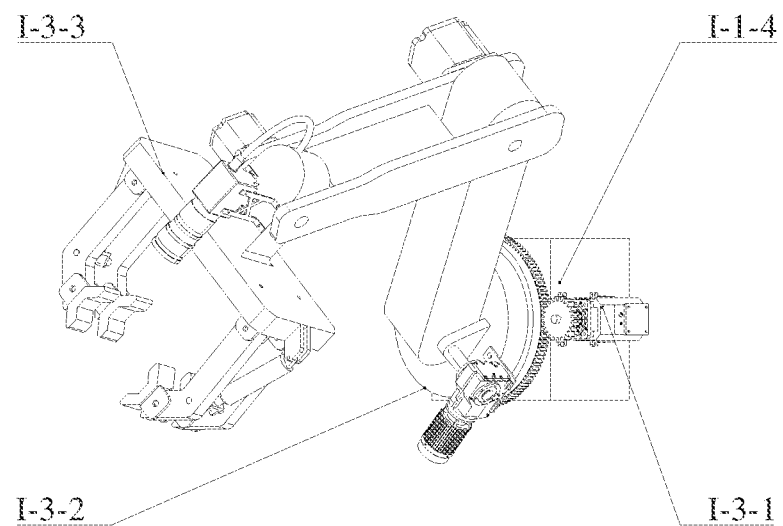
FIG. 12 is an axonometric drawing of the first robot according to the Embodiment 3 of the invention.
Figure 13:
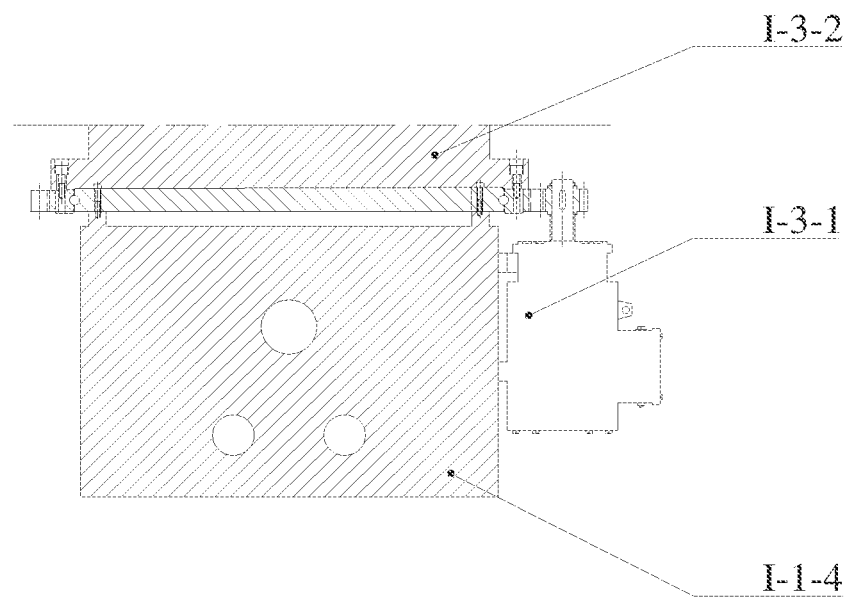
FIG. 13 is a sectional view of the installation of the first robot according to the Embodiment 3 of the invention.

As shown in FIG. 12-FIG. 13, the first robot I-3 includes the main motor I-3-1, the turntable I-3-2, the mechanical claw I-3-3, wherein the front side of the sliding block I-1-4 is provided with a slewing support, the side of the sliding block I-1-4 is provided with main motor I-3-1, the main shaft of the main motor is provided with a gear that meshes with the slewing support, the slewing support is provided with turntable I-3-2, and the rotation of the main motor I-3-1 can drive the turntable to rotate, and the first robot I-3 is provided with mechanical arms at all levels, mechanical arms and turntable, and mechanical claws I-3-3. Therefore, the first robot I-3 has six degrees of freedom and can ascend and descend with the ball screw sliding table.

Figure 14:
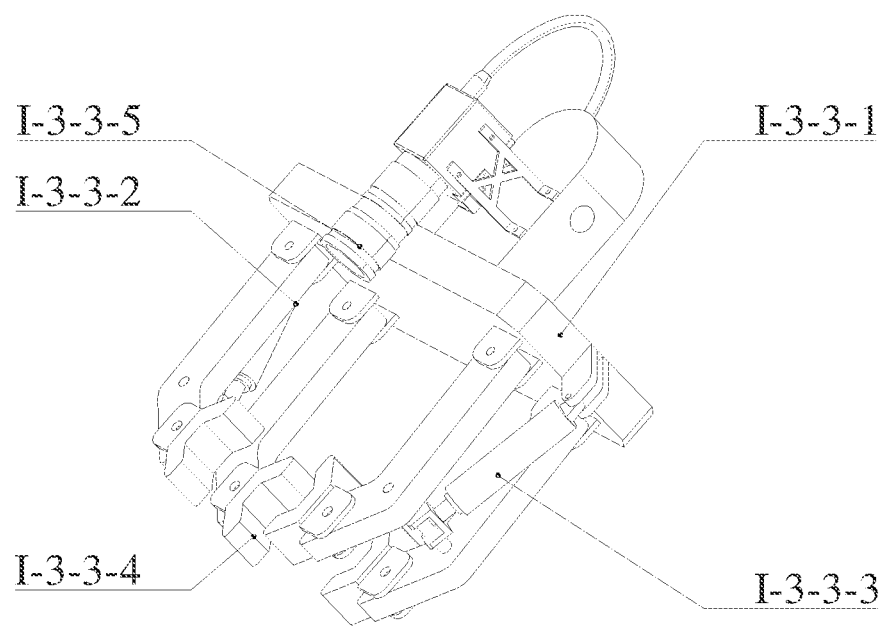
FIG. 14 is an axonometric drawing of the first robot manipulator according to the Embodiment 3 of the invention.

As shown in FIG. 14, the mechanical claw I-3-3 of the first robot I-3 includes the mounting seat I-3-3-1, the strut I-3-3-2, the cylinder I-3-3-3, the V-shaped block I-3-3-4, and the industrial camera I-3-3-5. Among them four struts I-3-3-2 are symmetrically installed on the mounting seat I-3-3-1 up and down, left and right respectively, and are hinged with the mounting seat I-3-3-1, and the two struts I-3-3-2 which are vertically related to each other are connected by pin shafts. Two cylinders I-3-3-3 are respectively installed at both ends of the mounting seat I-3-3-1, the cylinder body of the cylinder I-3-3-3 is hinged with the mounting seat I-3-3-1, and the piston rod of the cylinder I-3-3-3 is hinged with the pin shaft between the two I-3-3-2. Driven by the piston rod of the cylinder I-3-3-3, the strut I-3-3-2 can swing within a certain angle. The V-shaped block is installed at the end of the strut I-3-3-2, and the V-shaped block is hinged with the strut I-3-3-2 to adapt to clamped objects of different sizes. The industrial camera I-3-3-5 is installed on the mounting base I-3-3-1 through a bracket, which is used to acquire image information, identify the type and position of the fixture system I-7, and optimize the posture of the first robot I-3 during the transportation process so that the first robot I-3 can transport and position the fixture system I-7 to a specified position. The mechanical claw I-3-3 is used to clamp the base part of the fixture system I-7, and all kinds of supporting fixtures of moving supports can be clamped by this mechanical claw I-3-3.

Figure 15:
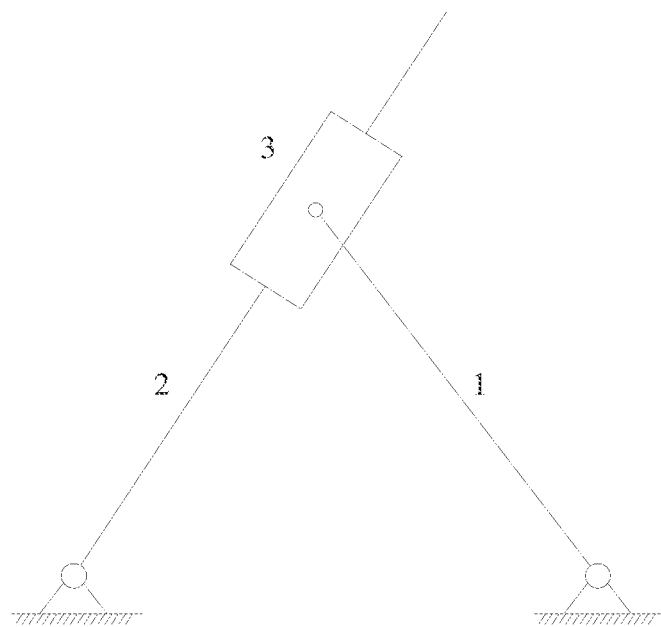
FIG. 15 is a schematic diagram of the clamping mechanism of the first robot manipulator according to the Embodiment 3 of the invention.

The mechanism diagram of mechanical claw I-3-3 is shown in FIG. 15, and the strut I-3-3-2 can be simplified as component 1; cylinder I-3-3-3 can be simplified as component 2; the piston rod of cylinder I-3-3-3 can be simplified as component 3. It can be seen that the number of institutions in this mechanism is n=3, the number of rotating pairs is 3 and the number of moving pairs is 1. According to the freedom calculation formula:

$$F=3n-2P_1-P_h,$$

the degree of freedom of this mechanism is 1.

It should be noted that the second robot I-4 has the same structure as the first robot I-3 except the mechanical claw.

Figure 16:
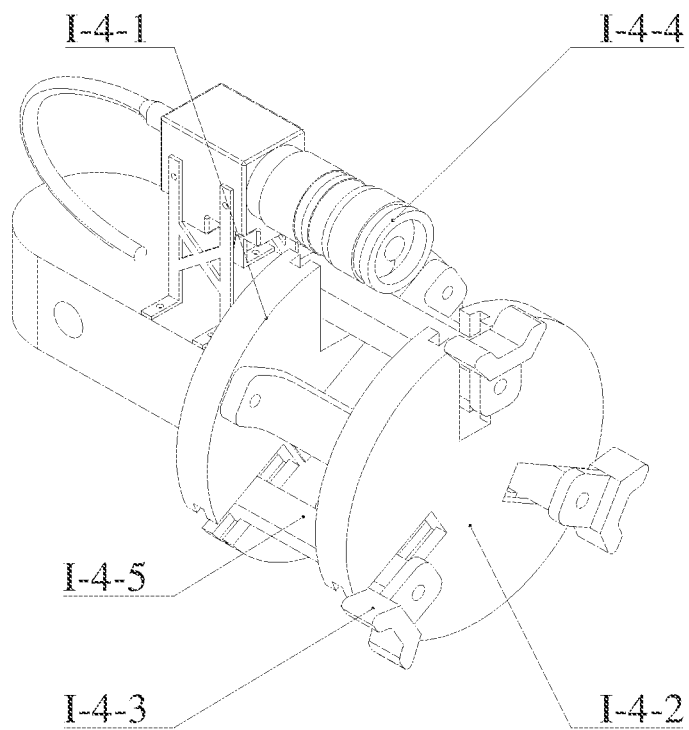
FIG. 16 is an axonometric drawing of the second robot manipulator according to the Embodiment 3 of the invention.
Figure 17:
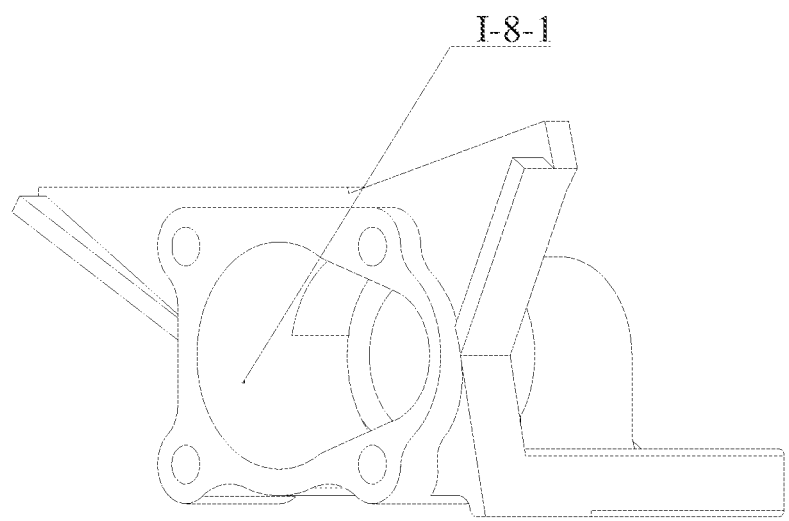
FIG. 17 is an axonometric drawing of workpieces according to the Embodiment 3 of the invention.

As shown in FIG. 16-FIG. 17, the mechanical claw of the second robot I-4 includes the mounting seat I-4-1, the upper mounting plate I-4-2, the supporting block I-4-3, the industrial camera I-4-4, the guide rod I-4-5. Among them, industrial camera I-4-4 is installed on the mounting seat I-4-1 through a bracket to acquire image information to identify the workpieces I-8 and acquire the position of the workpieces I-8, and optimize the pose of the second robot I-4 during the transportation process to accurately position the workpieces I-8 on the fixture system I-7. The upper mounting plate I-4-2 is fixedly installed on the mounting seat I-4-1, and the upper mounting plate I-4-2 is installed in alignment with the guide groove on the mounting seat I-4-1. A steering gear is installed on the mounting seat I-4-1, and three guide rods I-4-5 are circumferentially arranged and installed in the guide grooves of the mounting seat I-4-1 and the upper mounting plate I-4-2. The guide rods I-4-5 are connected with the steering gear arm on the steering gear through the connecting rod, and the steering gear drives the steering gear arm to rotate, which is converted into the radial movement of the guide rods I-4-5 through the connecting rod, and supporting block I-4-3 is fixedly connected on guide rods I-4-5. The mechanical claw of the second robot I-4 is used to grab the workpieces I-8. Driven by the steering gear, the three guide rods I-4-5 move radially, so that the supporting block I-4-3 installed by them is supported on the surface of the inner circle I-8-1 of the workpiece I-8. It should be noted that the inner circle I-8-1 of the workpieces I-8 is not a finished circle, and the mechanical claws of the second robot I-4 support its surface internally, so that it is necessary to adjust its posture to enable its three supporting blocks I-4-3 to support the surface of the inner circle I-8-1.

It should be noted that the mechanical claw of the second robot I-4 is not limited to the handling of the workpiece I-8, and all moving supports with inner circles and corresponding sizes can be used for handling the mechanical claw.

Figure 18:
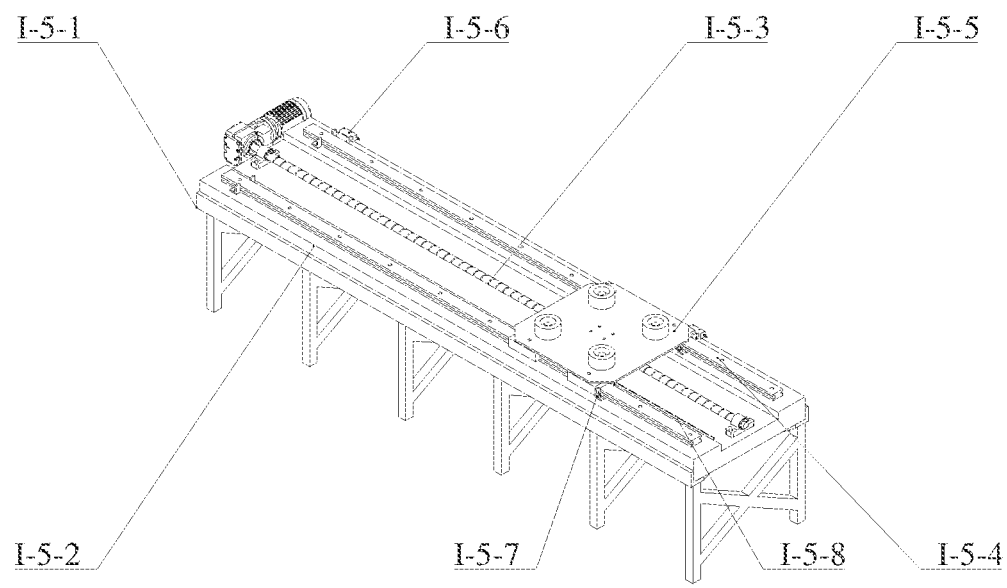
FIG. 18 is an isometric view of the conveying table according to the Embodiment 3 of the invention.

As shown in FIG. 18, the conveying table I-5 includes the bracket I-5-1, the mounting seat I-5-2, the ball screw I-5-3, the linear guide rail I-5-4, the bearing platform I-5-5, the photoelectric sensor I-5-6, the stop seat I-5-7 and the rack I-5-8. Among them, the mounting seat I-5-2 is fixedly installed on the bracket I-5-1, and the cross section of the mounting seat I-5-2 is a rectangular shape with an inwardly concaved middle portion at one side, in which the ball screw I-5-3 is installed in the middle, and the linear guide I-5-4 is symmetrically installed on both sides. The bearing platform I-5-5 is fixedly installed on the sliding table of the ball screw I-5-3 and the linear guide I, and the motor drives the ball screw I-5-3 to drive the bearing platform I-5-5 to move along the linear guide I-5-4. Photoelectric sensor I-5-6 and stop seat I-5-7 are installed at the beginning and end of the travel of the bearing platform I-5-5, respectively. The photoelectric sensor I-5-6 is used to monitor the moving position of the bearing platform I-5-5 and transmit signals to the computer. The computer stops the rotation of the ball screw, and the stop seat I-5-7 is used to mechanically stop the movement of the bearing platform so as to make its positioning accurate.

Figure 19:
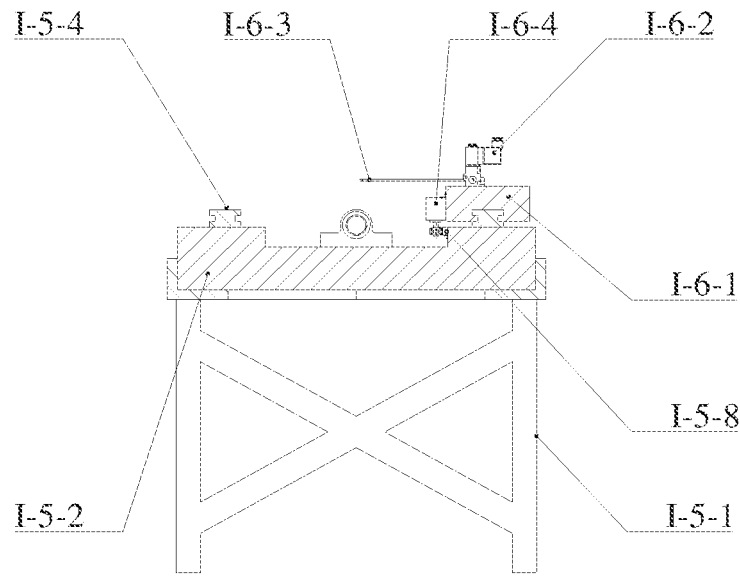
FIG. 19 is a sectional view of the installation of the quick insertion device according to the Embodiment 3 of the invention.

As shown in FIG. 19, the quick insertion device I-6 is installed on the linear guide I-5-4 of the conveying table I-5 and includes the sliding block I-6-1, the solenoid valve I-6-2, the quick air pipe connector I-6-3, and the speed reduction motor I-6-4. Four solenoid valves I-6-2 are fixedly installed on the sliding block I-6-1 side by side, and the outlet end of the solenoid valves I-6-2 is connected with the quick air pipe connector I-6-3, which needs to be aligned with the air passage interface of the fixture I-7 installed on the bearing platform I-5-5, and the quick air pipe connector I-6-3 and the air passage interface of the fixture I-7 can be quickly inserted and pulled out. The side of the sliding block I-6-1 is provided with the speed reduction motor I-6-4, and the gear installed on the main shaft of the reduction motor I-6-4 is meshed with the rack I-5-8 installed on the conveying table I-5. The rotation of the main shaft of the speed reduction motor I-6-4 drives the sliding block I-6-1 to move along the linear guide I-5-4, so that the quick air pipe connector I-6-3 and the air passage interface on the fixture I-7 can be quickly inserted and pulled out.

Embodiment 4

Figure 22:
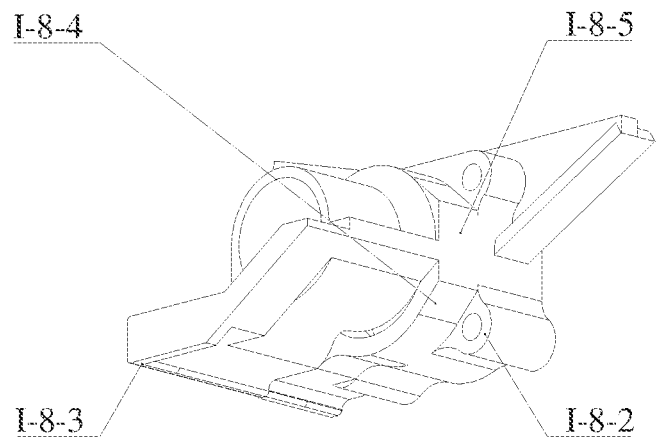
FIG. 22 is an axonometric drawing of workpieces according to the Embodiment 4 of the invention.

The embodiment 4 proposes the fixture I-7-1 in the fixture system I-7 in the follower fixture process system I;

as shown in FIG. 22, workpieces I-8 of a moving support need to be clamped once in the machining center to realize face milling, contour milling, ring milling, plunge milling, boring, drilling, tapping and thread milling. The fixture I-7-1 proposed in the embodiment 4 is used for positioning and clamping the workpieces I-8 in this process.

Figure 20:
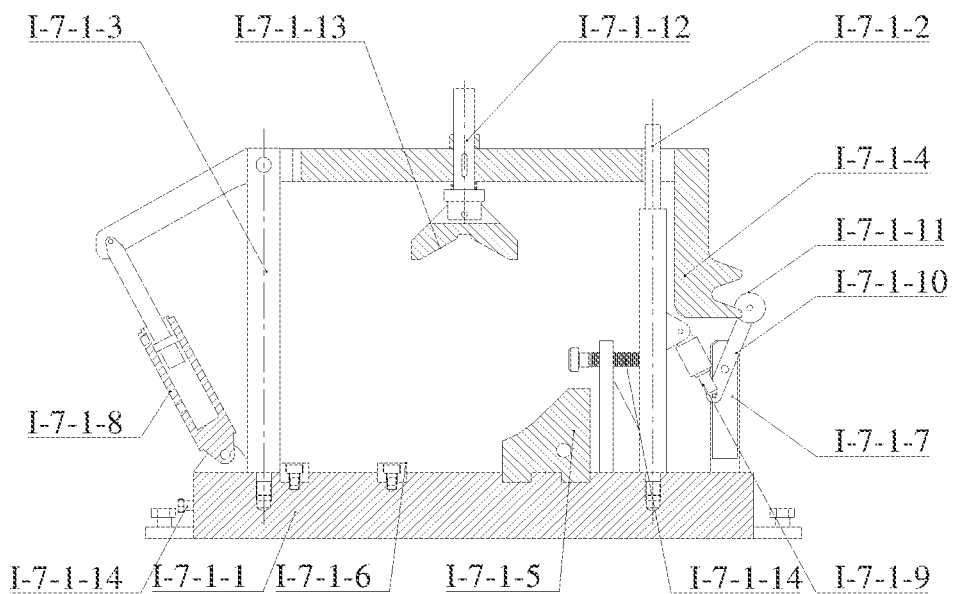
FIG. 20 is a sectional view of the fixture according to the Embodiment 4 of the invention.
Figure 21:
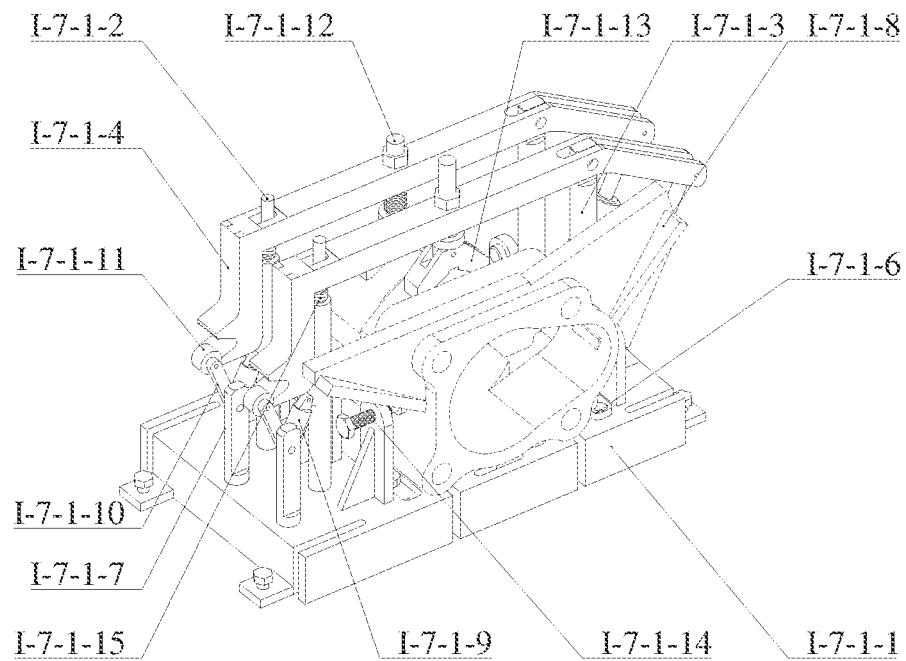
FIG. 21 is axonometric drawing of the fixture according to the Embodiment 4 of the invention.

As shown in FIG. 20-FIG. 22, the fixture I-7-1 includes the bottom plate I-7-1-1, the first column I-7-1-2, the second column I-7-1-3, the pressure bar I-7-1-4, the profiling positioning block I-7-1-5, the strip positioning block I-7-1-6, the heightening column I-7-1-7, the first cylinder I-7-1-8, the second cylinder I-7-1-9, the connecting rod I-7-1-10, the roller I-7-1-11, the guide rod I-7-1-12 and the V-shaped block I-7-1-11 and the supporting nail I-7-1-14.

The fixture I-7-1 can be divided into positioning mechanism and clamping mechanism; the positioning mechanism consists of profiling positioning block I-7-1-5, strip positioning block I-7-1-6 and supporting nail I-7-1-14. The contact between the positioning surface of strip positioning block I-7-1-6 and the curved surface of profiling positioning block I-7-1-5 and the bottom surface and side curved surface of workpieces I-8 can limit the rotation along X, Y and movement along Z axis of the workpiece I-8, the contact of two supporting nails I-7-1-14 with the side plane of the workpieces I-8 can limit the movement of the workpieces I-8 along the X axis and the rotation along the Z axis, and the contact of the supporting nail I-7-1-14 installed on the side of the profiling positioning block I-7-1-5 with the mounting surface of the workpieces I-8 can limit the movement of the workpieces I-8 along the Y axis. The clamping mechanism consists of columns, cylinders and the pressure plate, and the cylinders drive the connecting rod mechanism to press the pressure plate on the surface of the workpiece.

It should be noted that the first cylinder I-7-1-8 and the second cylinder I-7-1-9 are both locking cylinders. Among them, the bottom plate I-7-1-1 is provided with a square groove and a support nail mounting seat for mounting the positioning block and the supporting nail I-7-1-14, the threaded hole is used for mounting the first column I-7-1-2 and the second column I-7-1-3, and the side surface is provided with the first cylinder I-7-1-8 and the air passage interface I-7-1-15 of the second cylinder I-7-1. The first column I-7-1-2 and the second column I-7-1-3 are installed on the left and right sides of the bottom plate I-7-1, respectively, and the heightening column I-7-1-7 is installed on the right side of the first column I-7-1-2. Two strip positioning blocks I-7-1-6 and profiling positioning blocks I-7-1-5 are respectively installed in the square groove of the bottom plate I-7-1-1 for positioning the workpiece I-8. It should be noted that the mounting surface and positioning surface of the strip positioning blocks I-7-1-6 need to be finished to ensure the positioning accuracy. The front of the profiling positioning block I-7-1-5 is provided with a threaded hole for mounting a supporting nail I-7-1-14, and its curved surface and mounting surface need finishing, and its curved surface radian and curvature are equal to that of the side curved surface of the workpiece I-8. During positioning, the curved surface of the profiling positioning block I-7-1-5 needs to be completely attached to the side curved surface I-8-4 of the workpiece I-8. The first cylinder I-7-1-8 is installed on the left side of the second column I-7-1-3. The cylinder body of the first cylinder I-7-1-8 is hinged with the mounting seat on the bottom plate I-7-1-1. The piston rod of the first cylinder I-7-1-8 is hinged with the left end of the pressure rod I-7-1-4 and the pressure rod I-7-1-4 is hinged with the second column I-7-1-3. The right end of the pressure plate I-7-1-4 is provided with a through slot. When the first cylinder I-7-1-8 drives the pressure rod I-7-1-4 to rotate clockwise, the extending end of the first column I-7-1-2 can extend out of the through slot of the pressure plate I-7-1-4. The second cylinder I-7-1-9 is installed on the mounting seat of the first column I-7-1-2. The cylinder body of the second cylinder I-7-1-9 is hinged with the mounting seat of the first column I-7-1-2. The piston rod of the second cylinder I-7-1-9 is hinged with one end of the connecting rod I-7-1-9, and the other end of the connecting rod I-7-1-9 is provided with the roller I-7-1-11. When the second cylinder I-7-1-9 drives the connecting rod I-7-1-9 to rotate counterclockwise, the rotating roller I-7-1-11 at the end of the connecting rod I-7-1-9 is pressed into the groove of the pressure plate I-7-1-4. The extending end of the first column I-7-1-2 is provided with the sliding sleeve I-7-1-15. A through hole is arranged in the middle of the pressure plate I-7-1-4, and the guide rod I-7-1-12 is installed in the through hole, and the guide rod I-7-1-12 is connected with the through hole by a key, so that the rotation of the guide rod I-7-1-12 is restricted. A spring is installed between the guide rod I-7-1-12 and the pressure plate I-7-1-4, which plays a buffering role in pressing the pressure plate I-7-4. The bottom of the guide rod I-7-1-12 is hinged with a V-shaped block I-7-1-13 for pressing the workpiece I-8, and can adapt to the clamping surfaces of workpieces I-8 of various sizes.

The fixture I-7-1 is positioned in such a way that the bottom surface I-8-3 of the workpieces I-8 and the side curved surface I-8-4 are the positioning base surfaces. The strip positioning block I-7-1-6 is in contact with the bottom surface I-8-3 of the workpieces I-8 and the curved surface of the profiling positioning block I-7-1-5 is in contact with the side curved surface I-8-4 of the workpiece I-8, thereby restricting the rotation of the workpieces I-8 along the X and Y axes and the movement of the Z axis. Two supporting nails I-7-1-14 are respectively installed on the supporting nail mounting seat and contact with the side plane I-8-5 of the workpieces I-8 to limit the movement of the workpieces I-8 along the Y axis and the rotation of the Z axis. One supporting nail I-7-1-14 is installed on the profiling positioning block I-7-1-5 and contacts with the mounting surface I-8-2 of the workpieces I-8 to limit the movement along the X axis.

The clamping method of the fixture I-7-1 is that the first cylinder I-7-1-8 drives the pressure plate I-7-1-4 to rotate clockwise, so that the V-shaped block I-7-1-13 is pressed on the workpiece I-8. The second cylinder I-7-1-9 drives the connecting rod I-7-1-10 to rotate counterclockwise, so that the roller I-7-1-11 is pressed into the groove of the pressure plate I-7-1-4. At this time, the first cylinder I-7-1-8 and the second cylinder I-7-1-9 reach the maximum stroke and are locked, and the V-shaped block I-7-1-13 is completely pressed against the workpieces I-8 to complete the clamping.

The release mode of the fixture I-7-1 is as follows: the second cylinder I-7-1-9 drives the connecting rod I-7-1-10 to rotate clockwise to make the roller I-7-1-11 separate from the groove of the pressure plate I-7-1-4, and the first cylinder I-7-1-8 drives the pressure plate I-7-1-4 to rotate counterclockwise to make it V-shaped block separate from the surface of the workpiece I-8.

Figure 23:
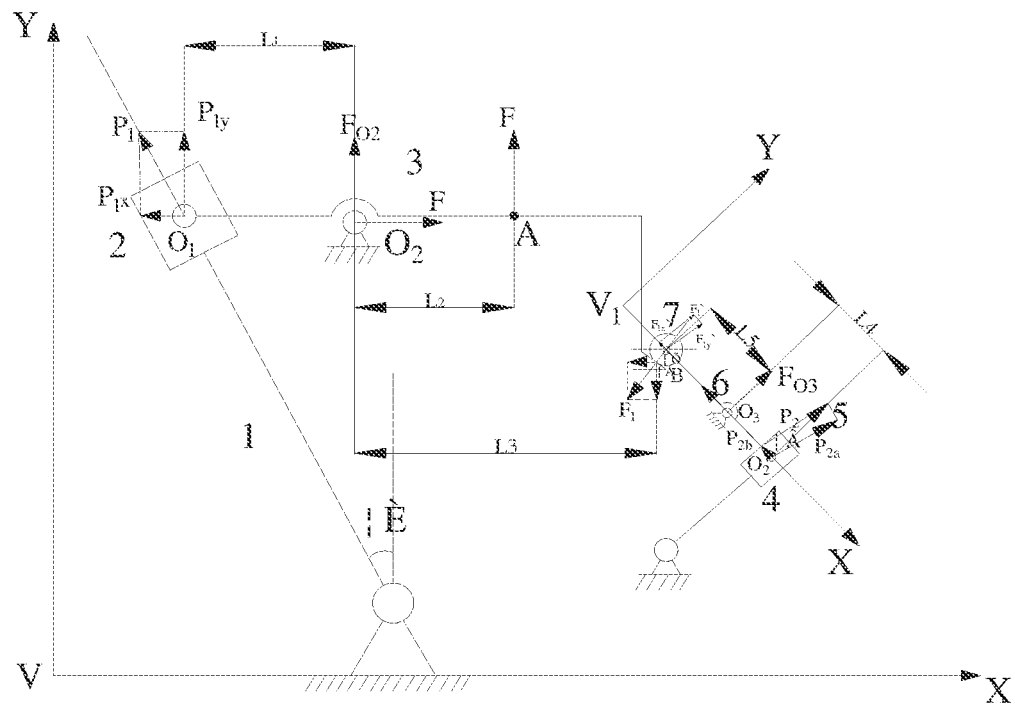
FIG. 23 is a schematic diagram of the fixture clamping mechanism according to the embodiment 4 of the invention.

The clamping mechanism of the fixture I-7-1 can be simplified as the mechanism diagram shown in FIG. 23. The cylinder body of the first cylinder I-7-1-8 is simplified as component 1, the piston rod is simplified as component 2, the pressure plate I-7-4 is simplified as component 3, the cylinder body of the second cylinder I-7-1-9 is simplified as component 5, the piston rod is simplified as component 4, and the connecting rod I-7-1-10 is simplified as component 6 and the roller I-7-1-11 is simplified as component 7. The rotation of the roller I-7-1-11 around its own axis does not affect the movement of other components, so it is a kind of local degree of freedom. Therefore, the mechanism has a total number of components n=7, a low pair pl=9, a high pair ph=1 and a local degree of freedom F'=1. According to the freedom calculation formula: $F=3n-2P_l-P_h$, the degree of freedom is 1.

The stress diagram of the clamping mechanism of fixture I-7-1 is shown in FIG. 23. It is assumed that the pressure plate I-7-1-4 is horizontal in the clamping state, regardless of the friction between rotating pairs. According to the stress analysis of the pressure plate I-7-1-4, that is, the component 3, the O1 point in the component 3 is perpendicular to the rod, the O2 point is perpendicular to the supporting force of the moving support, the A point is subjected to an elastic force F exerted by the spring, the contact point between the component 3 and the roller I-7-1-11 is subjected to the pressure F1 perpendicular to the contact surface exerted by the roller I-7-1-11, and the force balance in Y direction and the moment balance at O2 point for component 3 can be obtained as follows:

$$P_{1y}+F+F_{O2}-F_{1y}=0 \qquad (1)$$

$$P_{1y}L_1+F_{1y}L_3=FL_2 \qquad (2);$$

where $P_{1y}$ is the component force of thrust P of the first cylinder I-7-1-8 in the Y-axis direction; $P_{1x}$ is the component force of the thrust P of the first cylinder I-7-1-8 in the X axis direction; $F_{1y}$ is the component of the pressure F1 of the roller I-7-1-11 on the pressure plate I-7-1-4 in the Y-axis direction; $F_{1x}$ is the component of the pressure F1 of the roller I-7-1-11 on pressure plate I-7-1-4 in the X-axis direction; $F_{O2}$ is the component force of the counterforce of the support to the component 3 along the Y direction; $L_1$ is the vertical distance from the hinge center of the piston rod of the first cylinder I-7-1-8 and the pressure plate I-7-1-4 to the hinge center of the pressure plate I-7-1-4 and the second column I-7-1-3; $L_2$ is the vertical distance from the center point of the guide rod I-7-1-12 to the hinge center point of the pressure plate I-7-1-4 and the second column I-7-1-3; $L_3$ is the vertical distance from the contact point of roller I-7-1-11 and pressure plate I-7-1-4 to the hinge center point of pressure plate I-7-1-4 and second column I-7-1-3.

After sorting out formulas (1) and (2), the following is obtained $$F = \frac{F_{1y}L_3 + P_{1y}L_1}{L_2}. \qquad (3)$$

Component 6 and component 7 are considered as a whole. A rectangular coordinate system V1 is established along the component 6 for the X axis and perpendicular to the component 6 for the Y axis. According to the analysis of the overall force, it can be seen that the F1 reverse force exerted by the pressure plate I-7-1-4, the force exerted by the component 4 perpendicular to the component 6, and the supporting reaction of the moving support. The moment balance of component 6 and 7 at O3 point can be obtained:

$$P_{2a}L_4=F_{1y}'L_5 \qquad (4);$$

Where $P_{2a}$ is the component of the thrust force of the piston rod of the second cylinder I-7-1-9 in the direction perpendicular to the component 6; $L_4$ is the vertical distance between the hinge center of the piston rod of the second cylinder I-7-1-9 and the connecting rod I-7-1-10 and the hinge center of the connecting rod and the heightening column I-7-1-7; $L_5$ is the vertical distance between the hinge center point of the connecting rod I-7-1-10 and the heightening column I-7-1-7 and the contact point of the roller I-7-1-11 and the pressure plate I-7-1-4; $F_{1y}'$ is the component of the reaction force F1' of F1 to the member 6 in the direction perpendicular to the component 6.

According to formula (4), it is obtained:

$$F_{1y}' = P_{2a}\frac{L_4}{L_5}; \qquad (5)$$

where $P_{2a}=P_2 \sin \beta$, $P_{1y}=P_1 \cos \theta$, $F_{1y}=F_1 \cos \alpha$ and $$F_1' = \frac{F_{1y}'}{\sin \varphi}$$

into formula (3)(4)(5) to obtain:

$$F = \frac{\frac{P_2 \sin \beta L_4}{L_5 \sin \varphi}\cos \alpha L_3 + P_1 \cos \theta L_1}{L_2}; \qquad (6)$$

where β is the included angle between the forming direction of the piston rod of the second cylinder I-7-1-9 and the connecting rod I-7-1-10; the θ is the included angle between the cylinder body I-7-1-8 of the first cylinder and the vertical direction; φ is the included angle between the center of the circle of the roller I-7-1-11 and the contact point between the roller I-7-1-11 and the pressing plate I-7-1-4 and the component 6.

Assuming that the tangential contact force m under the condition that there is no relative sliding between the workpiece and the fixture element in the milling process, and the contact area between the main positioning base surface of the workpieces I-8 and the fixture is A, if the position of the workpieces I-8 does not change relative to the fixture I-7-1 in the machining process, the clamping force acting on the workpiece must ensure that the fixture element and the workpiece do not slide relative to each other under the action of the maximum contact force, which is the theoretical minimum clamping force $F_{Nmin}$, that is:

$$F_{Nmin} = \frac{M_{max}}{\mu} - G; \quad (7)$$

where $F_{Nmin}$ is the minimum pressing force; $M_{max}$ is the maximum tangential contact force; G is the workpiece gravity.

The clamping force $F_N$ generated by the fixture I-7-1 on the workpieces I-8 is the elastic reaction force generated by the spring on the pressure plate I-7-1-4, which is equal to F and opposite to F. To make the fixture I-7-1 clamp reliably, the following must be fulfilled:

$$F_N = F \geq \frac{M_{max}}{\mu} - G. \quad (8)$$

Embodiment 5

The embodiment 5 proposes another fixture I-7-2 in the fixture system I-7 in the follower fixture process system I, which is used for clamping the same workpiece as the fixture I-7-1 proposed in the embodiment 4.

The fixture I-7-2 in the invention mainly includes the positioning mechanism and the clamping mechanism, wherein the positioning mechanism includes the strip positioning block, the profiling positioning block and the supporting nail, and no supporting nail is installed on the side surface of the profiling positioning block. The contact of strip positioning block positioning surface and curved surface of the profiling positioning block with the bottom surface and side curved surface of the workpiece can limit the rotation of the workpiece along the X and Y directions and the movement along the Z axis; the contact of three supporting nails with the side plane of the workpiece can limit the movement of the workpiece along the X axis and the rotation along the Z axis; the contact of the side surface of the profile positioning block with the mounting surface of the workpiece can limit the rotation of the workpiece along the Z axis, the Y axis and the movement along the X axis. The clamping mechanism consists of the column and the pressure plate, and the pressure plate clamps the workpiece by twisting the nut.

Figure 24:
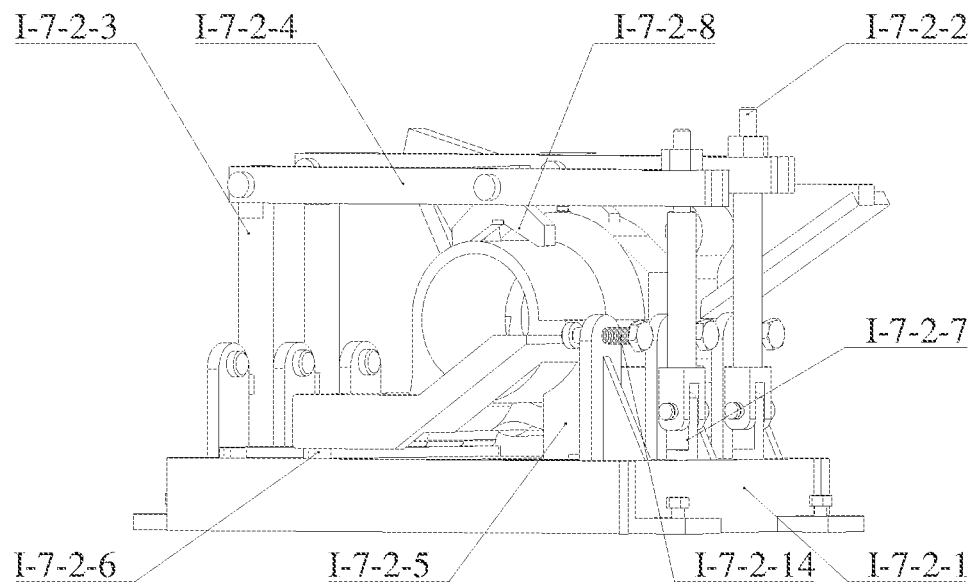
FIG. 24 is an axonometric drawing of the fixture according to the Embodiment 5 of the invention.
Figure 25:
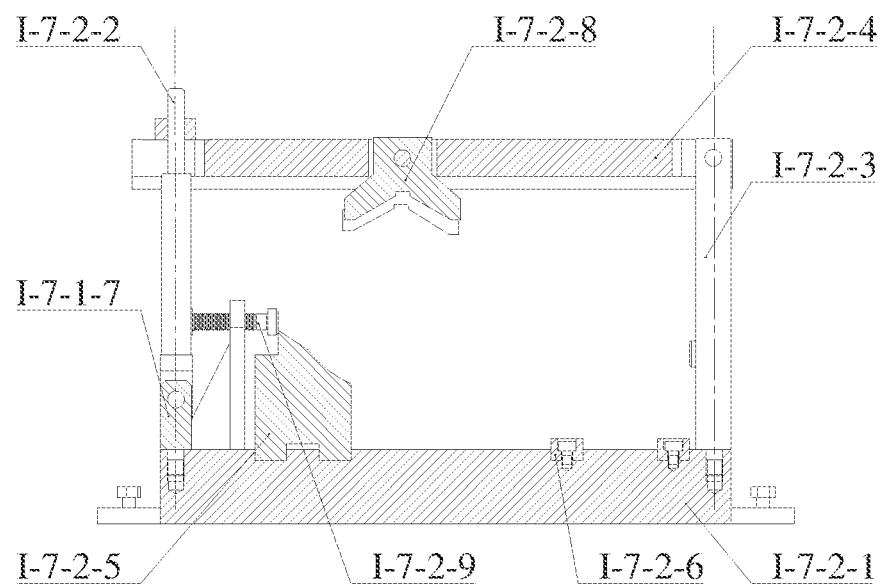
FIG. 25 is a sectional view of the fixture according to the embodiment 5 of the invention.

As shown in FIG. 24-FIG. 25, the fixture I-7-2 includes the bottom plate I-7-2-1, the first column I-7-2-2, the second column I-7-2-3, the pressure bar I-7-2-4, the profiling positioning block I-7-2-5, the strip positioning block I-7-2-6, the heightening column I-7-2-7, the V-shaped block I-7-2-8 and the supporting nail I-7-2-9. Among them, the bottom plate I-7-2-1 is provided with a square groove and the supporting nail mounting seat for mounting the positioning block and the supporting nail I-7-2-14, the threaded hole is used for mounting the heightening column I-7-2-7 and the second column I-7-2-3, the heightening column I-7-2-7 and the second column I-7-2-3 are respectively installed on the left and right sides of the bottom plate I-7-2-1, and the first column I-7-2-2 is hinged with the heightening column I-7-2-7. Two strip positioning blocks I-7-2-6 and the profiling positioning block I-7-2-5 are respectively installed in the square groove of the bottom plate I-7-2-1 for positioning the workpiece I-8. It should be noted that the mounting surface and positioning surface of the strip positioning blocks I-7-2-6 need finishing to ensure positioning accuracy, the curved surface and mounting surface of the profiling positioning block I-7-2-5 need finishing, and the curved surface of the profiling positioning block I-7-2-5 needs to be completely fitted with the side curved surface I-8-4 of the workpiece I-8. One end of the pressure plate I-7-2-4 is hinged with the second column I-7-2-3, and the other end is provided with a notch which passes through the extending end of the first column I-7-2-2 and is pressed on the shoulder of the first column I-7-2-2 by a nut. The notch in the middle of the pressure plate I-7-2-4 is hinged with the V-shaped block to adapt to the clamping of curved surfaces of different sizes.

The fixture I-7-2 is positioned in such a way that the bottom surface I-8-3 and the side curved surface I-8-4 of the workpieces I-8 are the positioning base surfaces. The strip positioning block I-7-2-6 is in contact with the bottom surface I-8-3 of the workpieces I-8 and the curved surface of the profiling positioning block I-7-1-5 is in contact with the side curved surface I-8-4 of the workpiece I-8, thereby restricting the rotation of the workpieces I-8 along the X and Y axes and the movement of the Z axis. Three supporting nails I-7-2-9 are respectively installed on the supporting nail mounting seat and contact with the side plane I-8-5 of the workpieces I-8 to limit the movement of the workpieces I-8 along the Y axis and the rotation of the Z axis. The front of the profiling positioning block I-7-2-5 is in contact with the mounting surface I-8-2 of the workpieces I-8 to restrict the rotation of the workpieces I-8 along the Z axis, the Y axis and the movement along the X axis.

The clamping method of the fixture I-7-2 is as follows: turning the first column I-7-2-2 clockwise and the pressing plate I-7-2-4 counterclockwise so that the protruding end of the first column I-7-2-2 passes through the notch on the pressing plate I-7-2-4. By twisting the nut on the extending end of the first column I-7-2-2, the V-shaped block on the pressure plate is pressed against the workpiece I-8. Clamping force of fixture I-7-2 can be adjusted by twisting nut.

The way to loosen the fixture I-7-2 is to twist the nut on the protruding end of the first column I-7-2-2 to loosen the pressing plate, turn the first column I-7-2-2 counterclockwise and turn the pressing plate I-7-2-4 clockwise. At this time, the workpieces I-8 are relaxed.

The application method of the follower fixture process system is as follows: when loading, the tooling plate I-11 are stacked on the two right-angle plates I-2-8 of the lifting platform I-2, the computer gives the working instructions to the follower fixture process system, and the motor on the conveying table I-5 drives the ball screw I-5-3 to rotate, thus driving the bearing platform I-5-5 to move directly under the tooling plates I-11 along the linear guide rail. At this time, the photoelectric sensor I-5-6 installed on the conveying table I-5 detects the position signal of the bearing platform I-5-5 to control the ball screw to stop moving, and the stop seat I-5-7 installed on the conveying table I-5 mechanically stops the bearing platform I-5-5, so that the bearing platform I-5-5 just stops under the tooling plate. The computer controls the rotation of the main shaft of the motor I-2-3 of the lifting platform I-2, so that the lifting platform I-2 can be lowered to a predetermined position through gear and rack transmission, and the four supporting columns at the bottom of the tooling plate I-11 can be embedded into the four mounting holes on the bearing platform I-5-5. The cylinder I-2-4 on the lifting platform I-2 retracts to make the two right-angle plates I-2-8 installed on the slider of the linear guide I-2-7 move backward, and the lifting platform moves the two tooling plates I-11 upward by the interval distance to the tooling plate I-11 on the penultimate layer, the piston rod of the cylinder I-2-4 retracts and the two right-angle plates I-2-8 move opposite to each other under the tooling plate I-11 on the penultimate layer, so that the stop blocks I-2-9 installed on the two right-angle plates I-2-8 are attached to the tooling plate I-11. The lifting platform I-2 carries the rest of the tooling plate I-11 upward. The bearing platform I-5-5 carries the tooling plate I-11 to the initial position on the conveying table I-5. At the initial position, the photoelectric sensor I-5-6 and the stop seat I-5-7 are also installed to locate the position of the bearing platform I-5-5. The first robot I-3 identifies the fixture system I-7 on the loading platform I-10 and transports it to the bearing platform I-5-5, and realizes positioning by a machine vision system. Screwing manipulator I-9 tightens the screws on the fixture system I-7, so that the fixture system I-7 is screwed with the tooling plate I-11. At this time, the fixture system I-7 and the tooling plate I-11 together form the follower fixture system. The second robot identifies the workpieces I-8 on the loading platform I-10 and transports it to the fixture system I-7 for positioning. The quick insertion device I-6 is inserted into air pipe connector I-7-1-14 of the fixture I-7-1 in the fixture system I-7, and a high-pressure air source is supplied to the cylinder, so that the fixture system I-7 clamps the workpiece I-8.

When unloading, the quick insertion device I-6 is inserted into the air pipe connector I-7-1-14 of the fixture I-7-1 in the fixture system I-7, and a high-pressure air source is introduced into the cylinder, so that the fixture system I-7 relaxes the workpiece I-8. The screwing manipulator I-9 unscrews the screws connecting the fixture system I-7 and the tooling plate I-11. The first mechanical claw I-3 and the second mechanical claw I-4 respectively transport the fixture system I-7 and the workpieces I-8 to the loading platform I-10, and the bearing platform I-5-5 carries the tooling plate I-11 to the stop seat I-5 at the end of the conveying table I-5-5. The lifting platform I-2 descends to make the right-angle plates I-2-8 fall to the lower surface of the tooling plate I-11, and the cylinder I-2-4 extends to make the two right-angle plates I-2-8 move in a pair, until the stop block I-2-9 on the right-angle plates I-2-8 is attached to the tooling plate I-11, and the lifting platform I-2 rises upwards, so that the workpieces I-8 are disassembled.

In the description of the invention, it should be understood that the terms "longitudinal", "transverse", "up", "down", "front", "back", "left", "right", "vertical", "horizontal", "top", "bottom", "inside" and "outside" are based on the orientation or positional relationship shown in the drawings, and are only for the convenience of describing the invention, rather than indicating or implying that the device or component referred to must have a specific orientation, be configured and operated in a specific orientation, and therefore cannot be understood as a limitation to the invention.

The above-mentioned embodiments only describe the preferred mode of the invention, and do not limit the scope of the invention. Without departing from the design spirit of the invention, all kinds of modifications and improvements made by ordinary technicians in the field to the technical scheme of the invention fall within the protection scope determined by the claims of the invention.

What is claimed is:

1. A process system of a follower fixture for tank moving support, comprising: a conveying table (I-5); wherein
    a bearing platform (I-5-5) is slidably installed on the conveying table (I-5) through a screw slide rail assembly; an outer frame assembly (I-1) is arranged across the conveying table (I-5);
    a lifting platform (I-2) is slidably installed in the outer frame assembly (I-1), positions of the lifting platform (I-2) and the bearing platform (I-5-5) are corresponded up and down, a robot component is slidably installed on one side of the outer frame assembly (I-1);
    two sides of the conveying table (I-5) are provided with loading platforms (I-10) respectively, a plurality of workpieces (I-8) are placed on one of the loading platforms (I-10), and a fixture system (I-7) is placed on the other one of the loading platforms (I-10); and
    the fixture system (I-7) and the plurality of workpieces (I-8) are both placed in a moving range of the robot component, and positions of the fixture system (I-7) and the workpieces (I-8) are corresponded;
    wherein the outer frame assembly (I-1) comprises an IT-shaped bracket (I-1-1); a vertical middle plane of the II-shaped bracket (I-1-1) coincides with vertical middle planes of the lifting platform (I-2) and the conveying table (I-5);
    wherein two ends of a top surface of the IT-shaped bracket (I-1-1) are respectively fixedly provided with vertical motors (I-1-2); main shafts of the two vertical motors (I-1-2) penetrate through the top surface of the IT-shaped bracket (I-1-1) and are respectively connected with vertical ball screws (I-1-3) through couplings;
    the two vertical ball screws (I-1-3) are vertically arranged at two ends of the IT-shaped bracket (I-1-1) and are arranged at a same side of the IT-shaped bracket (I-1-1); first guide rods (I-1-5) are vertically arranged between a side surface of the IT-shaped bracket (I-1-1) and the vertical ball screws (I-1-3); and
    the vertical ball screws (I-1-3) are further provided with mounting tables (I-1-4), top surfaces of the mounting tables (I-1-4) are provided with through holes, and the mounting tables (I-1-4) are slidably mounted on the first guide rods (I-1-5) through the through holes.

2. The process system of the follower fixture for tank moving support according to claim 1,
    wherein the conveying table (I-5) comprises a fixed bracket (I-5-1) and a conveying mounting seat (I-5-2), and a top surface of the fixed bracket (I-5-1) is fixedly provided with the conveying mounting seat (I-5-2);
    wherein a cross section of the conveying mounting seat (I-5-2) is a rectangular shape with an inwardly concaved middle portion at one side, a first rack (I-5-8) is installed on one side wall of an inner cavity of the conveying mounting seat (I-5-2), and the first rack (I-5-8) is meshed with a mounting gear of a quick insertion device (I-6); and the quick insertion device (I-6) and the fixture system (I-7) are arranged at a same side of the conveying mounting seat (I-5-2).

3. The process system of the follower fixture for tank moving support according to claim 2, wherein the screw slide rail assembly comprises a horizontal ball screw (I-5-3), linear guide rails (I-5-4) and a horizontal screw motor; the horizontal ball screw (I-5-3) is fixedly installed on a bottom surface of the inner cavity of the conveying mounting seat (I-5-2), the horizontal screw motor is in transmission connection with one end of the horizontal ball screw (I-5-3) through a coupling, and the horizontal screw motor is fixedly installed at one side of a top surface of the fixed bracket (I-5-1);
    wherein top surfaces of two sides of the conveying mounting seat (I-5-2) are respectively fixedly provided with the linear guide rails (I-5-4); and
    wherein sliding tables are slidably provided with the ball screw (I-5-3) and the linear guide rails (I-5-4), and the bearing platform (I-5-5) is fixedly installed on the sliding tables.

4. The process system of the follower fixture for tank moving support according to claim 3, wherein two ends of one of the linear guide rails (I-5-4) are respectively provided with a photoelectric sensor (I-5-6) and a stop seat (I-5-7); the photoelectric sensor (I-5-6) is configured for monitoring moving positions of the bearing platform (I-5-5) and transmitting signals to a computer, the computer is configured to stop a rotation of the horizontal ball screw (I-5-3), and the stop seat (I-5-7) is configured for mechanically stopping a movement of the bearing platform (I-5-5).

5. The process system of the follower fixture for tank moving support according to claim 3, wherein the quick insertion device (I-6) comprises a sliding block (I-6-1), electromagnetic valves (I-6-2), quick air pipe connectors (I-6-3) and a speed reduction motor (I-6-4);
wherein the sliding block (I-6-1) is slidably installed on one of the linear guide rails (I-5-4);
wherein a number of the electromagnetic valves (I-6-2) is at least two, and the at least two electromagnetic valves (I-6-2) are linearly arranged and fixedly installed on the sliding block (I-6-1); outlet ends of the electromagnetic valves (I-6-2) are connected with the quick air pipe connectors (I-6-3) respectively, the quick air pipe connectors (I-6-3) are corresponded to positions of air passage interfaces of the fixture system (I-7), a side wall of the sliding block (I-6-1) is fixedly provided with the speed reduction motor (I-6-4), and the mounting gear disposed on a main shaft of the speed reduction motor (I-6-4) is engaged with the first rack (I-5-8).

6. The process system of the follower fixture for tank moving support according to claim 1, wherein the top surface of each of the mounting tables (I-1-4) is provided with two of the through holes, and the two of the first guide rods (I-1-5) are arranged in the two of through holes; each of the vertical ball screws (I-1-3) and the two of the first guide rods (I-1-5) are arranged in a triangular structure; a side of the mounting tables (I-1-4) far away from the IT-shaped bracket (I-1-1) is provided with the robot component through a slewing support.

7. The process system of the follower fixture for tank moving support according to claim 1, wherein an inner cavity of the IT-shaped bracket (I-1-1) is further vertically provided with second guide rods (I-1-7) and second racks (I-1-6); the second guide rods (I-1-7) and the second racks (I-1-6) are symmetrically arranged in two groups left and right; the lifting platform (I-2) is slidably arranged on the second guide rods (I-1-7), and the lifting platform realizes lifting movement on the second racks (I-1-6).

8. The process system of the follower fixture for tank moving support according to claim 7, wherein the lifting platform (I-2) comprises a bearing plate (I-2-1), wherein a plain shaft (I-2-10) and a transmission shaft (I-2-11) are horizontally arranged in the bearing plate (I-2-1); a top surface of the bearing plate (I-2-1) is provided with a bearing motor (I-2-3), and a mounting gear on a main shaft of the bearing motor (I-2-3) is meshed with a gear at one end of the transmission shaft (I-2-11) up and down to realize transmission connection; gears at two ends of the transmission shaft (I-2-11) are meshed with the two second racks (I-1-6);
wherein two ends of the plain shaft (I-2-10) are respectively slidably installed on the two second guide rods (I-1-7) through T-joints;
wherein one side of the bearing plate (I-2-1) is further fixedly provided with a bending mounting plate (I-2-2), the bending mounting plate (I-2-2) is provided with right-angle plates (I-2-8) through a crank-slider mechanism, and the right-angle plates (I-2-8) are orderly provided with tooling plates (I-11).

9. The process system of the follower fixture for tank moving support according to claim 8, wherein the crank-slider mechanism comprises a reciprocating guide rail (I-2-7), a bearing cylinder (I-2-4), a flange (I-2-5) and two connecting rods (I-2-6);
wherein the reciprocating guide rail (I-2-7) is provided with the right-angle plates (I-2-8) through two sliding blocks; a middle of a top surface of the bending mounting plate (I-2-2) is provided with the bearing cylinder (I-2-4), a piston rod of the bearing cylinder (I-2-4) is placed upward, and the flange (I-2-5) is installed at an output end of the piston rod; the two connecting rods (I-2-6) are obliquely arranged, top ends of the two connecting rods (I-2-6) are hinged with the flange (I-2-5), and bottom ends of the two connecting rods (I-2-6) are respectively hinged with sides of the two sliding blocks on the reciprocating guide rail (I-2-7).

10. The process system of the follower fixture for tank moving support according to claim 1, wherein the robot component comprises a first robot (I-3) and a second robot (I-4); the first robot (I-3) and the second robot (I-4) are respectively installed on two of the mounting tables (I-1-4); the first robot (I-3) and the fixture system (I-7) are placed on one same side of the conveying table, and the second robot (I-4) and the workpieces (I-8) are placed on another same side of the conveying table.

11. The process system of the follower fixture for tank moving support according to claim 10, wherein the first robot (I-3) comprises a main motor (I-3-1), a turntable (I-3-2) and a first mechanical claw (I-3-3); and
wherein the main motor (I-3-1) is fixedly installed at one side of the mounting table (I-1-4); the mounting table (I-1-4) is provided with the turntable (I-3-2) through a slewing support; the turntable (I-3-2) is in transmission connection with the main motor (I-3-1); the first mechanical claw (I-3-3) is installed on the turntable (I-3-2); and the first mechanical claw (I-3-3) is configured for transporting the fixture system (I-7).

12. The process system of the follower fixture for tank moving support according to claim 11, wherein one side of the fixture system (I-7) is further provided with a screwing manipulator (I-9); the screwing manipulator (I-9) is configured to screw the fixture system (I-7) onto tooling plates (I-11) of the lifting platform (I-2).

13. The process system of the follower fixture for tank moving support according to claim 12, wherein the second robot (I-4) comprises a second mechanical claw, a second main motor and a second turntable; wherein mechanical structures of the second main motor and the second turntable are the same as that of the main motor (I-3-1) and the turntable (I-3-2) respectively;
wherein the second mechanical claw comprises a second mounting seat (I-4-1), an upper mounting plate (I-4-2), supporting blocks (I-4-3), an industrial camera (I-4-4) and guide rods (I-4-5);
wherein the second mounting seat (I-4-1) is mounted on the second turntable; the industrial camera (I-4-4) is mount on the second mounting seat (I-4-1), and a camera lens of the industrial camera (I-4-4) faces the upper mounting plate;
wherein the second mounting seat (I-4-1) is fixedly connected with the upper mounting plate (I-4-2); guide grooves are correspondingly arranged on the second mounting seat (I-4-1) and the upper mounting plate (I-4-2) in a circumferential direction, and the number of the guide grooves is the same as that of the guide rods (I-4-5);

wherein two ends of the guide rods (I-4-5) are respectively installed in corresponding ones of the guide grooves of the second mounting seat (I-4-1) and the upper mounting plate (I-4-2); the supporting blocks (I-4-3) are respectively installed at ends of the guide rods (I-4-5) and are limited on an end face of the upper mounting plate (I-4-2); and wherein a steering gear is installed on the second mounting seat (I-4-1), and the guide rods (I-4-5) are connected with a steering arm of the steering gear through connecting rods, so as to realize radial movement of the guide rods (I-4-5).

14. An automatic processing production line comprising: a follower fixture process system (I), an automatic conveying device (II), a circular conveyor line (III), a horizontal machining center (IV), a buffer table (V), a robot (VI), a vertical machining center (VII), a safety protection system (VIII) and a monitoring system (IX);

wherein the follower fixture process system (I) is the process system of the follower fixture for tank moving support according to claim 1.

* * * * *